US012037840B2

(12) United States Patent
MacDonald et al.

(10) Patent No.: US 12,037,840 B2
(45) **Date of Patent: *Jul. 16, 2024**

(54) DOOR ASSEMBLY

(71) Applicant: Endura Products, LLC, Colfax, NC (US)

(72) Inventors: Kevin T. MacDonald, Greensboro, NC (US); Tomasz Jaskiewicz, Oak Ridge, NC (US); Eric Johnson, Edenton, NC (US)

(73) Assignee: ENDURA PRODUCTS, LLC, Colfax, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,023

(22) Filed: Mar. 10, 2023

(65) Prior Publication Data

US 2023/0220726 A1 Jul. 13, 2023

Related U.S. Application Data

(63) Continuation of application No. 17/679,543, filed on Feb. 24, 2022, now Pat. No. 11,634,944, which is a (Continued)

(51) Int. Cl.
*E06B 7/28* (2006.01)
*E06B 1/08* (2006.01)

(Continued)

(52) U.S. Cl.
CPC .................. *E06B 7/28* (2013.01); *E06B 1/08* (2013.01); *E06B 1/30* (2013.01); *E06B 1/32* (2013.01);

(Continued)

(58) Field of Classification Search
CPC ..... E06B 1/34; E06B 1/28; E06B 1/60; E06B 1/552; E06B 1/30; E06B 1/32; E06B 1/342; E06B 1/045; E06B 1/6007; E06B 1/62; E06B 1/18; E06B 3/9641; E06B 2001/622; E06B 1/08; E06B 1/52; E06B 1/524;

(Continued)

(56) References Cited

U.S. PATENT DOCUMENTS 3,609,928 A * 10/1971 Mock ........................ E06B 1/30 52/214
3,724,136 A * 4/1973 Forsberg ................. E06B 1/342 49/505

(Continued)

*Primary Examiner* — Jessie T Fonseca
(74) *Attorney, Agent, or Firm* — CANTOR COLBURN LLP

(57) ABSTRACT

A door assembly and a frame member for a door assembly. The door assembly may include at least one door panel and a door frame having a plurality of frame members including a header and a pair of side jambs. The invention may also be considered a frame member including a storage compartment. The frame member may include a core; and a top piece adjoining the core to form a structural member. The core and the top piece may be a composite of cellulosic material and at least one other material. The top piece may be a two-piece top piece and may include hollow cavities. Also disclosed are door jamb frame members and mullion frame members.

19 Claims, 35 Drawing Sheets

Related U.S. Application Data continuation of application No. 17/068,503, filed on Oct. 12, 2020, now Pat. No. 11,286,712, which is a continuation-in-part of application No. 15/911,256, filed on Mar. 5, 2018, now Pat. No. 10,801,248.

(60) Provisional application No. 62/466,584, filed on Mar. 3, 2017.

(51) Int. Cl.

| | |
|---|---|
| ***E06B 1/30*** | (2006.01) |
| ***E06B 1/32*** | (2006.01) |
| ***E06B 1/34*** | (2006.01) |
| ***E06B 1/52*** | (2006.01) |
| ***E06B 3/70*** | (2006.01) |
| *E06B 1/62* | (2006.01) |

(52) U.S. Cl.

CPC .................. *E06B 1/34* (2013.01); *E06B 1/52* (2013.01); *E06B 1/524* (2013.01); *E06B 1/528* (2013.01); *E06B 3/70* (2013.01); *E05Y 2201/11* (2013.01); *E05Y 2900/132* (2013.01); *E06B 2001/622* (2013.01); *E06B 2003/7049* (2013.01)

(58) Field of Classification Search

CPC ... E06B 1/528; E06B 3/70; E06B 7/28; E06B 7/231

See application file for complete search history.

(56) References Cited

U.S. PATENT DOCUMENTS

| | | | | | |
|---|---|---|---|---|---|
| 3,918,228 | A | | 11/1975 | LaBorde | |
| 3,974,606 | A | | 8/1976 | LaBorde | |
| 4,281,480 | A | | 8/1981 | Wendt | |
| 4,295,299 | A | * | 10/1981 | Nelson | E06B 1/34 49/504 |
| 4,330,972 | A | | 5/1982 | Sailor | |
| 4,430,830 | A | | 2/1984 | Sailor | |
| 4,439,935 | A | | 4/1984 | Kelly | |
| 5,058,323 | A | | 10/1991 | Gerritsen | |
| 5,203,130 | A | | 4/1993 | Freelove | |
| 5,435,106 | A | | 7/1995 | Garries et al. | |
| 5,491,951 | A | | 2/1996 | Riegelman | |
| 5,511,355 | A | | 4/1996 | Dingler | |
| 5,528,869 | A | | 6/1996 | Boomer et al. | |
| 5,634,303 | A | | 6/1997 | Ellingson | |
| 5,758,458 | A | | 6/1998 | Ridge | |
| 5,759,680 | A | | 6/1998 | Brooks et al. | |
| 5,836,118 | A | | 11/1998 | Thornton et al. | |
| 5,873,209 | A | | 2/1999 | Hagel | |
| 5,941,033 | A | | 8/1999 | Adams | |
| 5,987,843 | A | | 11/1999 | Canfield | |
| 6,003,277 | A | | 12/1999 | Graham et al. | |
| 6,050,037 | A | * | 4/2000 | Gifford | E06B 1/62 52/211 |
| 6,125,605 | A | | 10/2000 | Young | |
| 6,148,582 | A | | 11/2000 | Ellingson | |
| 6,378,266 | B1 | | 4/2002 | Ellingson | |
| 6,453,631 | B1 | | 9/2002 | Headrick | |
| 6,557,309 | B1 | | 5/2003 | Johnson | |
| 6,604,334 | B2 | | 8/2003 | Rochman | |
| 6,679,004 | B1 | | 1/2004 | Olberding et al. | |
| 6,680,090 | B2 | | 1/2004 | Godavarti et al. | |
| 6,766,621 | B2 | | 7/2004 | Reppermund | |
| 6,922,969 | B1 | | 8/2005 | Mina | |
| 7,043,883 | B1 | | 5/2006 | Cederberg et al. | |
| 7,160,601 | B2 | | 1/2007 | Ellingson | |
| 7,765,768 | B2 | | 8/2010 | Liang et al. | |
| 7,930,866 | B2 | | 4/2011 | Carlson et al. | |
| 7,971,400 | B2 | | 7/2011 | Boldt et al. | |
| 8,178,643 | B2 | | 5/2012 | Edstrom et al. | |
| 8,230,652 | B2 | | 7/2012 | An | |
| 8,266,856 | B2 | | 9/2012 | Carlson et al. | |
| 8,371,079 | B2 | | 2/2013 | An et al. | |
| 8,438,808 | B2 | | 5/2013 | Carlson et al. | |
| 8,490,350 | B1 | * | 7/2013 | Greely | E06B 1/34 52/287.1 |
| 8,499,509 | B2 | | 8/2013 | Sibbett | |
| 8,621,794 | B2 | | 1/2014 | An et al. | |
| 8,713,866 | B2 | * | 5/2014 | Gadoury | E06B 1/56 52/211 |
| 8,793,945 | B2 | | 8/2014 | An et al. | |
| 8,857,107 | B1 | | 10/2014 | Key | |
| 8,919,056 | B2 | * | 12/2014 | Rochman | E06B 1/34 52/211 |
| 9,238,934 | B2 | * | 1/2016 | Booi | E06B 1/342 |
| 9,803,413 | B2 | | 10/2017 | MacDonald | |
| 11,634,944 | B2 | | 4/2023 | MacDonald et al. | |
| 2002/0083663 | A1 | | 7/2002 | Ballantyne | |
| 2002/0174610 | A1 | | 11/2002 | Bennett et al. | |
| 2005/0257455 | A1 | | 11/2005 | Fagan | |
| 2006/0123719 | A1 | | 6/2006 | Careri | |
| 2006/0123720 | A1 | | 6/2006 | Liu | |
| 2007/0022699 | A1 | | 2/2007 | Wang | |
| 2007/0074469 | A1 | | 4/2007 | Plagemann et al. | |
| 2007/0277455 | A1 | | 12/2007 | Flanigan et al. | |
| 2008/0072506 | A1 | | 3/2008 | LeGoff | |
| 2008/0178541 | A1 | | 7/2008 | Kerscher et al. | |
| 2008/0178553 | A1 | | 7/2008 | Micho et al. | |
| 2009/0000224 | A1 | * | 1/2009 | Kerscher | E06B 1/32 52/204.1 |
| 2009/0211184 | A1 | | 8/2009 | Kerscher | |
| 2009/0255197 | A1 | | 10/2009 | Chapman | |
| 2010/0192489 | A1 | | 8/2010 | An | |
| 2011/0138714 | A1 | | 6/2011 | Van Seters | |
| 2013/0263536 | A1 | | 10/2013 | Peck et al. | |
| 2014/0102035 | A1 | | 4/2014 | Rochman | |
| 2017/0058593 | A1 | | 3/2017 | Albrecht | |
| 2017/0241190 | A1 | | 8/2017 | MacDonald | |
| 2020/0040649 | A1 | | 2/2020 | Harvey et al. | |
| 2020/0043271 | A1 | | 2/2020 | Anderson et al. | |

* cited by examiner

DOOR ASSEMBLY

This application is a Continuation of U.S. application Ser. No. 17/679,543, filed Feb. 24, 2022, which is a Continuation of U.S. application Ser. No. 17/068,503, filed Oct. 12, 2020, now U.S. Pat. No. 11,286,712, which is a Continuation-In-Part of U.S. application Ser. No. 15/911,256 filed Mar. 5, 2018, now U.S. Pat. No. 10,801,248. which claims the benefit of U.S. Provisional Application No. 62/466,584 filed Mar. 3, 2017, which is incorporated herein by reference in its entirety.

FIELD OF TECHNOLOGY

The present disclosure relates generally to entryways for a building and, more particularly, to frame members and a door assembly for a residence.

BACKGROUND

Frame components, such as, jambs and mullions, for exterior door systems are exposed to environmental elements and extremes such as moisture, temperature, and sunlight, which can attack and break down the frame material. Protective coatings such as exterior grade paints are typically used not only to improve appearance but also to protect the underlying material, which is traditionally and typically wood. These frame components are also prone to wicking up moisture from their bottom ends. This type of moisture can lead to decay over time, which compromises the appearance and structural integrity of the frame. Alternates to a traditional wood frame include aluminum cladded wood frames, which can be expensive, vinyl cladded wood frames, which are not very resistant to impact damage, or all-plastic extruded frames, which are not very rigid and are also susceptible to deformation under heat.

While all-plastic frames are more resistant to environmental degradation and may decrease maintenance needs, conventional all-plastic frames often include reduced structural strength. Other frames have included stiffening components of laminated wood or metallic type extrusions in attempts to address structural integrity degradation, however, such stiffening components create other challenges, by way of example, interfering with hardware fasteners used to anchor frames and frame components.

Thus, there remains a need for a new and improved door assembly and frame members that are decay resistant while, at the same time, have the appearance and strength of a traditional wood frame door assembly.

SUMMARY

The present disclosure is directed in one embodiment to a door assembly. The door assembly includes at least one door panel and a door frame having a plurality of frame members including a header and at least a pair of side jambs. The frame member includes a core; and a two-piece top piece adjoining the core to form a structural member with the core and the top piece is a composite of cellulosic material and at least one other material. The door assembly may further include an adjacent panel. The adjacent panel may be, in one example, at least one side light panel. In other examples, the panel may be a passive panel.

The core may be formed of a non-metallic material and preferably, in one embodiment, the core is a wood. Also, the core may further include a lower portion formed of a decay resistant material. In one embodiment, the lower portion formed of a decay resistant material is a cellulosic-plastic composite. The cellulosic portion of the cellulosic-plastic composite preferably is wood fiber. Also, the plastic portion of the cellulosic-plastic composite preferably is a thermoplastic. In one embodiment, the thermoplastic is a polyethylene.

In one embodiment, a door assembly may be considered a door frame member including at least one door panel. The door frame may have a plurality of frame members including a header and at least a pair of side jambs. The one frame member may include a core and at least one top piece. The top piece may include one or more hollow cavities. The top piece may adjoin to the core to form a structural member with the core. The door frame assembly may also include a trim profile.

The top piece may be a two-piece top piece and includes a stop portion and a rabbet portion. In one embodiment, the stop portion and the rabbet portion are generally L-shaped and the proximate end of the stop portion overlaps the corresponding proximate end of the rabbet portion. The overlapping proximate ends of the rabbet portion and the stop portion may form a weather strip slot and may further include a weather strip adapted to be received by the weather strip slot. In addition, the stop portion and the rabbet portion may be generally L-shaped and the distal ends of the stop portion and the rabbet portion may each or all overlap the sides of the underlying core. The top piece may include hollow cavities.

In other embodiments, the top piece may be a linear piece, the rabbet portion may be a linear piece, and/or may take on other configurations.

In one embodiment, the two-piece top piece is formed of a decay resistant material. The two-piece top piece may be a cellulosic-plastic composite. Preferably, the cellulosic portion of said cellulosic-plastic composite is wood fiber. The plastic portion of the cellulosic-plastic composite preferably is a thermoplastic. In one embodiment, the plastic is a polyvinyl chloride.

The amount of cellulosic material in the cellulosic-plastic composite may be between about 20 wt. % and about 70 wt. % of the weight of the cellulosic-plastic composite. Preferably, in one embodiment, the amount of cellulosic material in the cellulosic-plastic composite is between about 25 wt. % and about 45 wt. % of the weight of the cellulosic-plastic composite. In another embodiment, the amount of cellulosic material in the cellulosic-plastic composite is about 35 wt. % of the weight of the cellulosic-plastic composite.

The thickness of the two-piece top piece may be between about 10% and about 50% of the thickness of the frame member. In other embodiments, the thickness of the two-piece top piece is between about 10% and about 50% of the thickness of the frame member. In one embodiment, the thickness of the two-piece top piece is about 30% of the thickness of the frame member.

The frame member may further include a binder between the core and the two-piece top piece for attaching the core to the two-piece top piece to form the frame member. Preferably, in some examples, the binder is an adhesive. In one embodiment, the adhesive is a hot melt adhesive.

In one embodiment of the door assembly, each adjacent panel adjoins a mullion extending between the header and the base of the door assembly. Also, the door assembly may further include a sill extending underneath the at least one door panel. Further, the at least one door panel may be a raised panel door. In one embodiment, the door panel further includes at least one window panel.

The door assembly may further include hinges located between the door panel and the door frame or a mullion. Also, the door assembly may further include locking hardware to secure the at least one door panel to the door frame.

A frame member may be a door jamb and/or a door mullion, in various examples.

Accordingly, one aspect of the present disclosure is to provide a door assembly, the door assembly including at least one door panel and a door frame having a plurality of frame members including a header and at least a pair of side jambs; wherein the frame member includes a core and at least one top piece adjoining the core to form a structural member with the core and wherein the top piece is a composite of cellulosic material and at least one other material.

Another aspect of the present disclosure is to provide in a door assembly, including a door frame having a plurality of frame members, including a header and at least a pair of side jambs, the frame member including a core and a two-piece top piece adjoining the core to form a structural member with the core. The top piece, in this embodiment may be a composite of cellulosic material and at least one other material.

Still another aspect of the present disclosure is to provide a door assembly, the door assembly including at least one door panel and a door frame having a plurality of frame members including a header and at least a pair of side jambs. The frame member may include a core and a two-piece top piece adjoining the core to form a structural member with the core and the top piece is a composite of cellulosic material and at least one other material; and at least one side panel. The side panel, by way of example may be a light panel and/or a fixed panel.

Still in other embodiments, the present disclosure may be considered a frame member including a core and a two-piece top piece adjoining the core to form a structural member with the core and the top piece being a composite of cellulosic material and at least one other material. The top piece may be a 2-piece top piece and include a top piece cover and a top piece base.

The top piece cover may be a removable cover and fit removably with a top piece base. A hollow cavity may be formed between the top piece base and the top piece cover. A level assembly may be incorporated into a hollow portion of the top piece. The level assembly may be encased within the hollow cavity between the top piece base and the top piece cover. The level assembly may only be viewable externally when the top piece cover is removed. The level may provide installation feedback to assist in assembly and installation of frame members and door assemblies.

Examples may also include a door frame member for a door frame assembly including a hybrid jamb member. The hybrid jamb member may include a core and a top piece. The top piece may be formed of a rigid extrusion of a cellulosic-plastic composite material. The top piece may align with the core along the length of the core. There may be at least one hollow portion formed in the top piece between a top of the top piece and a base of the top piece. The hybrid jamb member may also include a trim profile. A length of the trim profile may be perpendicularly fitted to the length of the core and a length of the top piece. The top piece cover may include a downwardly projecting outer leg, a midleg, and an inner leg. The top piece base may include an upwardly projecting outer leg, a mid leg, and an inner leg. The outer leg of the cover may mate with the outer leg of the base and the mid leg of the cover. The mid leg of the base and of the cover may be configured to contact each other in a biased position, securing the cover to the base.

In other examples, a door assembly may include a door frame member including a core, a top piece and a vertically oriented trim profile/brick mould. The top piece may adjoin the core to form a structural member with the core. The top piece may include a stop portion and a rabbet portion adjoining to form a slot. The vertically oriented trim profile may mate with the core and the top piece. The trim profile may include at least one hollow cavity.

The frame members may be jambs. The frame members may be mullions.

The frame members may include a compartment for housing accessory components. Accessory components may include a variety of features. By way of example, electronic entry door features, such as electronic door locks (e.g., push button, biometric sensor, RFID reader), intercoms, cameras, motion sensors, and lighting, may be provided as modular, battery powered solutions for installation on or near an entry door, to provide additional security and convenience, and may, for example, provide for remote communication with a user (e.g., homeowner, business owner, resident, or employee), for example, through wireless communication (e.g., Wi-Fi or cellular) with the user's cell phone, tablet, or computer. Power to such components may be provided through the compartment in a frame member. A compartment may provide access from a power source to the component through a door frame member, by way of a compartment formed in the frame member. A storage compartment in the core may include a channel and a compartment. The channel may provide access to the compartment for features to be linked through the frame member.

These and other aspects of the inventions of the present disclosure will become apparent to those skilled in the art after a reading of the following description of embodiments when considered with the drawings.

DESCRIPTION OF EMBODIMENTS

Figure 1:
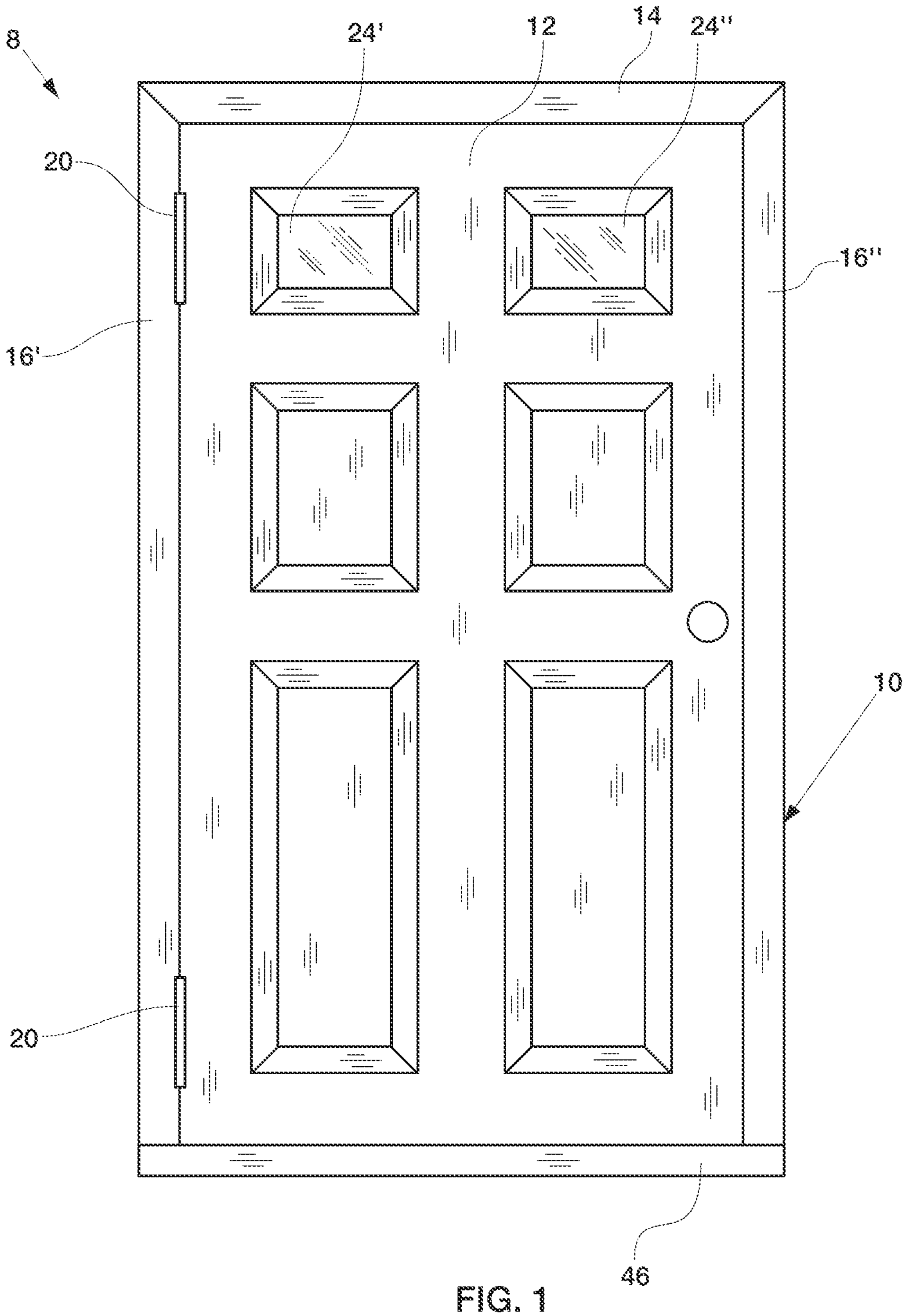
FIG. 1 is a front elevation view of one embodiment of a door assembly constructed according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a door assembly, generally designated 8, is shown constructed according to the present disclosure. The door assembly 8 includes a door frame 10 and at least one door panel 12.

Figure 2:
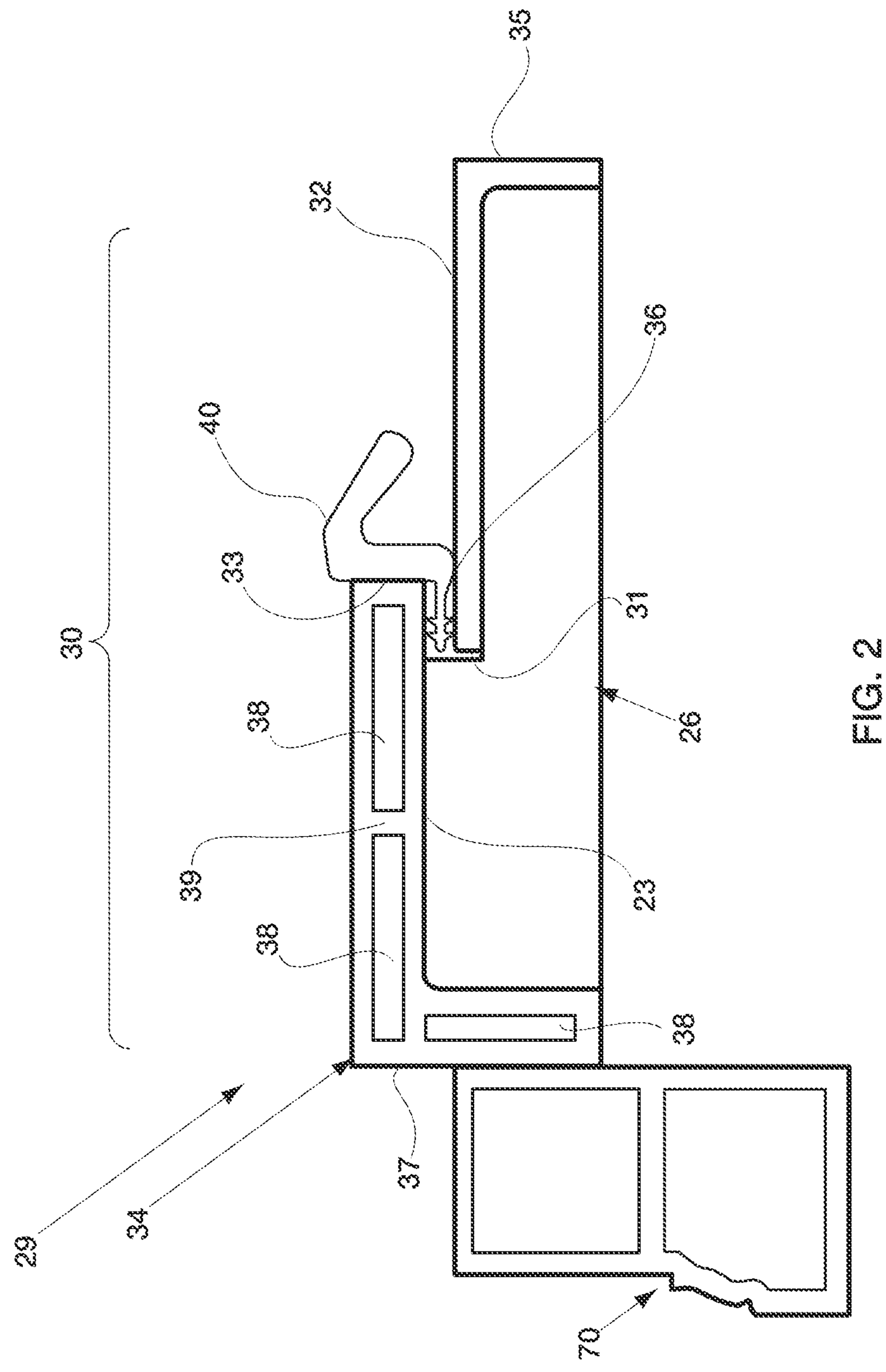
FIG. 2 is cross-sectional view of one embodiment of a frame member having a core, a trim profile and a top piece.

The door frame 10 may include one or more frame members 29 (see FIG. 2). A plurality of frame members may include any combination of a header 14 and a pair of side jambs 16' and 16". Header 14 may be generally placed toward the top of the door panel 12. Side jambs 16' and 16" may be generally placed at opposing sides of the door panel 12. However, in some embodiments, the side jambs are not directly adjacent to the door panel 12. Door panel 12 may further include hinges 20. Hinges 20 may connect door panel 12 to at least one of the frame members. In another embodiment, hinges 20 may connect door panel 12 to a mullion. There may be one, two, three or more hinges 20.

Figure 12:
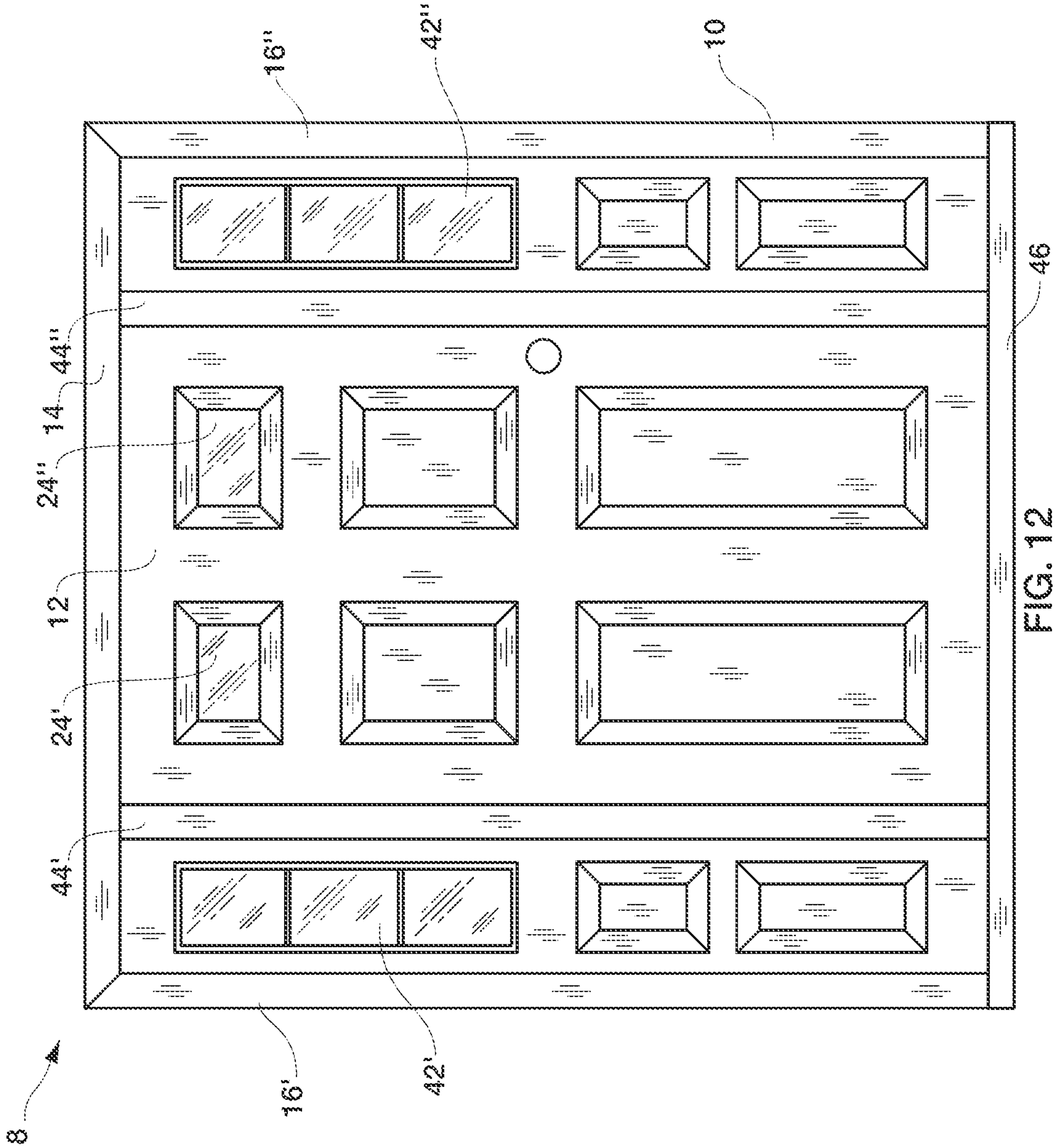
FIG. 12 is a front elevation view of one embodiment of a door assembly constructed according to the present disclosure.
Figure 14:
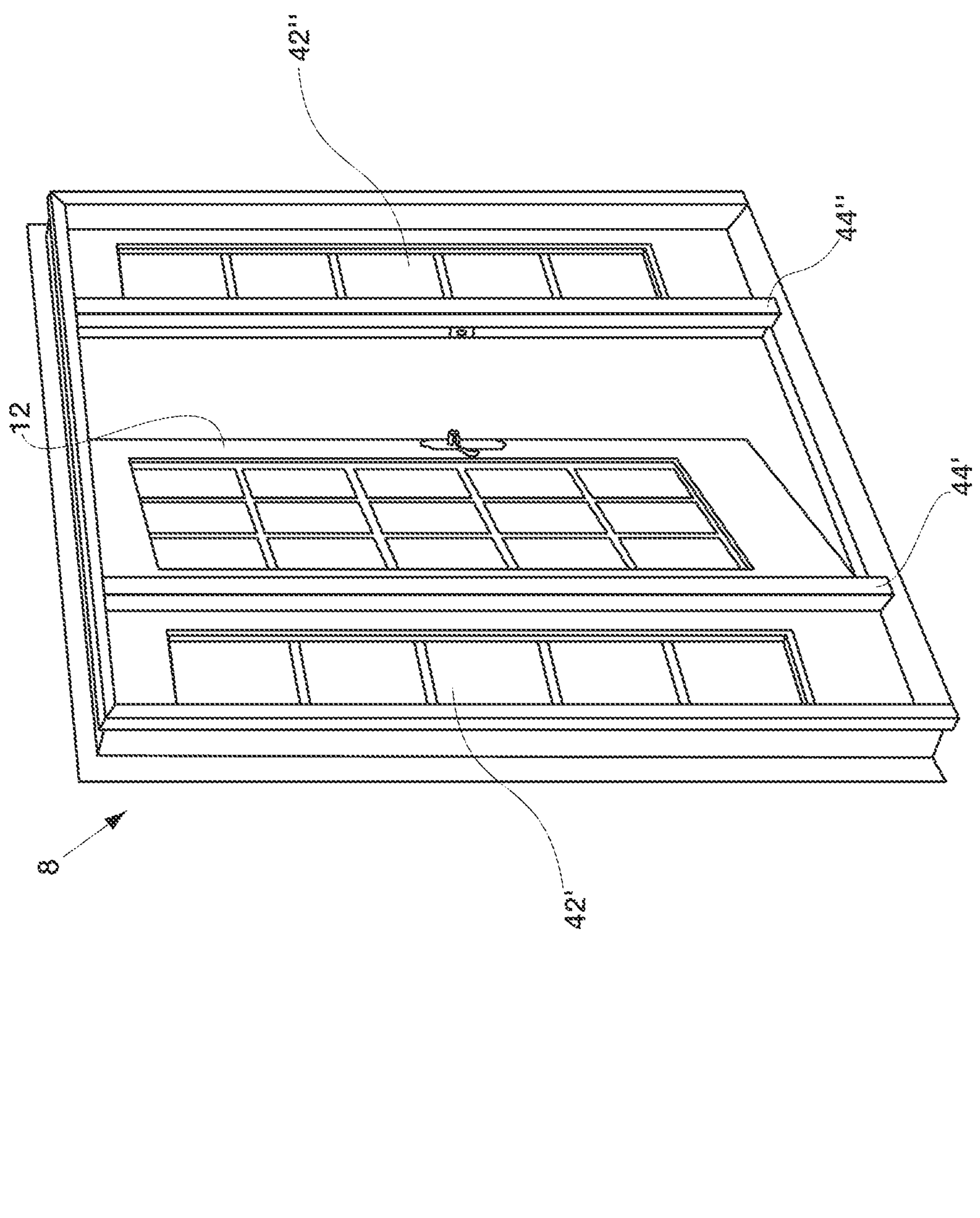
FIG. 14 is a front elevation view of another embodiment of a door assembly including at least one mullion frame member and constructed according to the present disclosure.

In other embodiments, the door panel 12 may also include locking hardware that enables the door panel to be secured to at least one of the frame members; for example, side jamb 16". Some examples of locking hardware include latches and deadbolts. Alternatively, door panel 12 may include locking hardware that enables it to be secured to a second door panel. Still in other embodiments, door panel 12 may include locking hardware to secure it to a mullion. More than one type of locking hardware mechanism may be used in certain embodiments; for instance, wherein at least two door panels may be used to constitute a French door assembly. In another embodiment, the door panel 12 is a raised panel door. The door panel 12, in one example, may include adjacent panels, for example, side light panels 42' and 42" and in other examples may include side light panels (see FIGS. 12 and 14). The door panel 12 may also include raised panels and/or glass panels, for example, 24' and 24".

Figure 3:
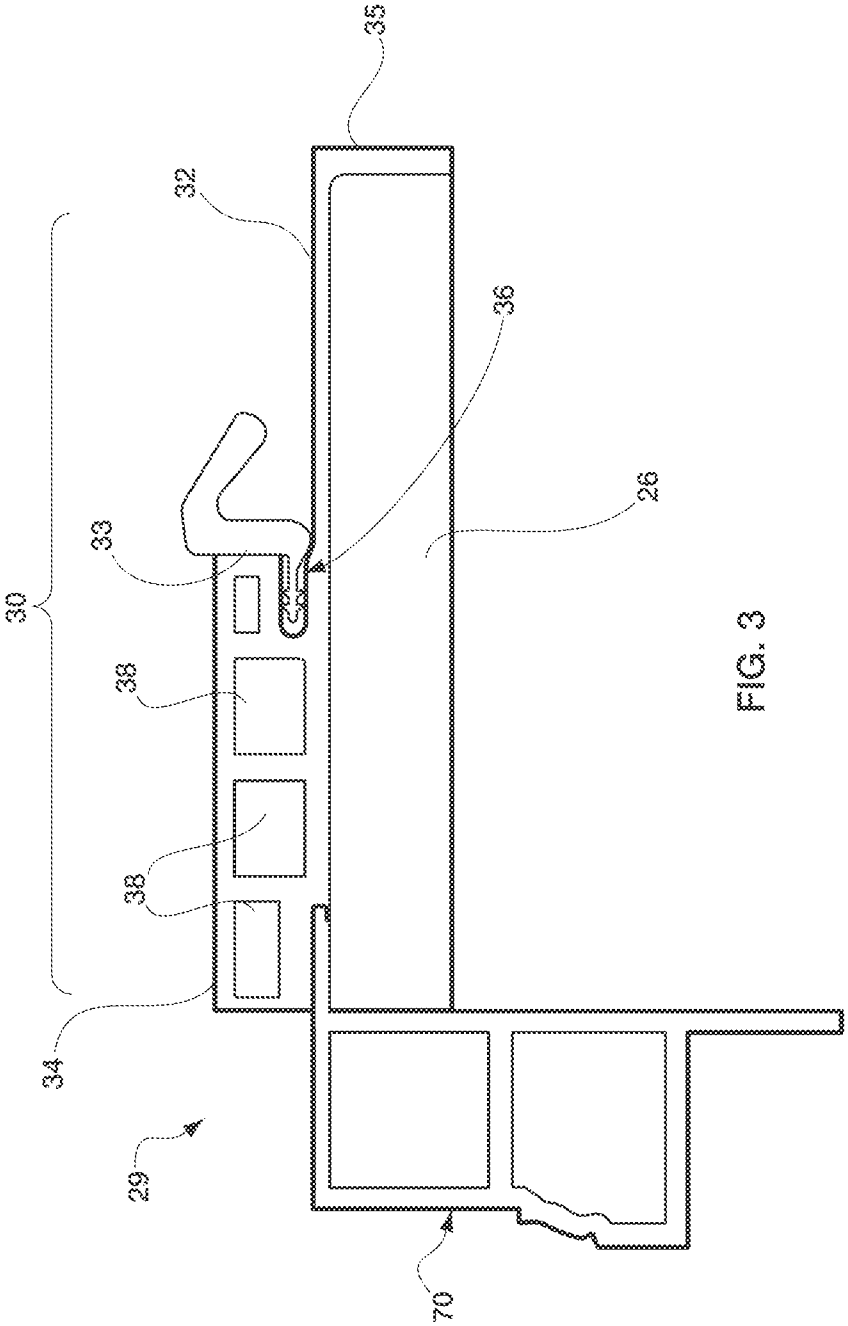
FIG. 3 is another cross-sectional view of one embodiment of a frame member having a core, a trim profile and a top piece.
Figure 4:
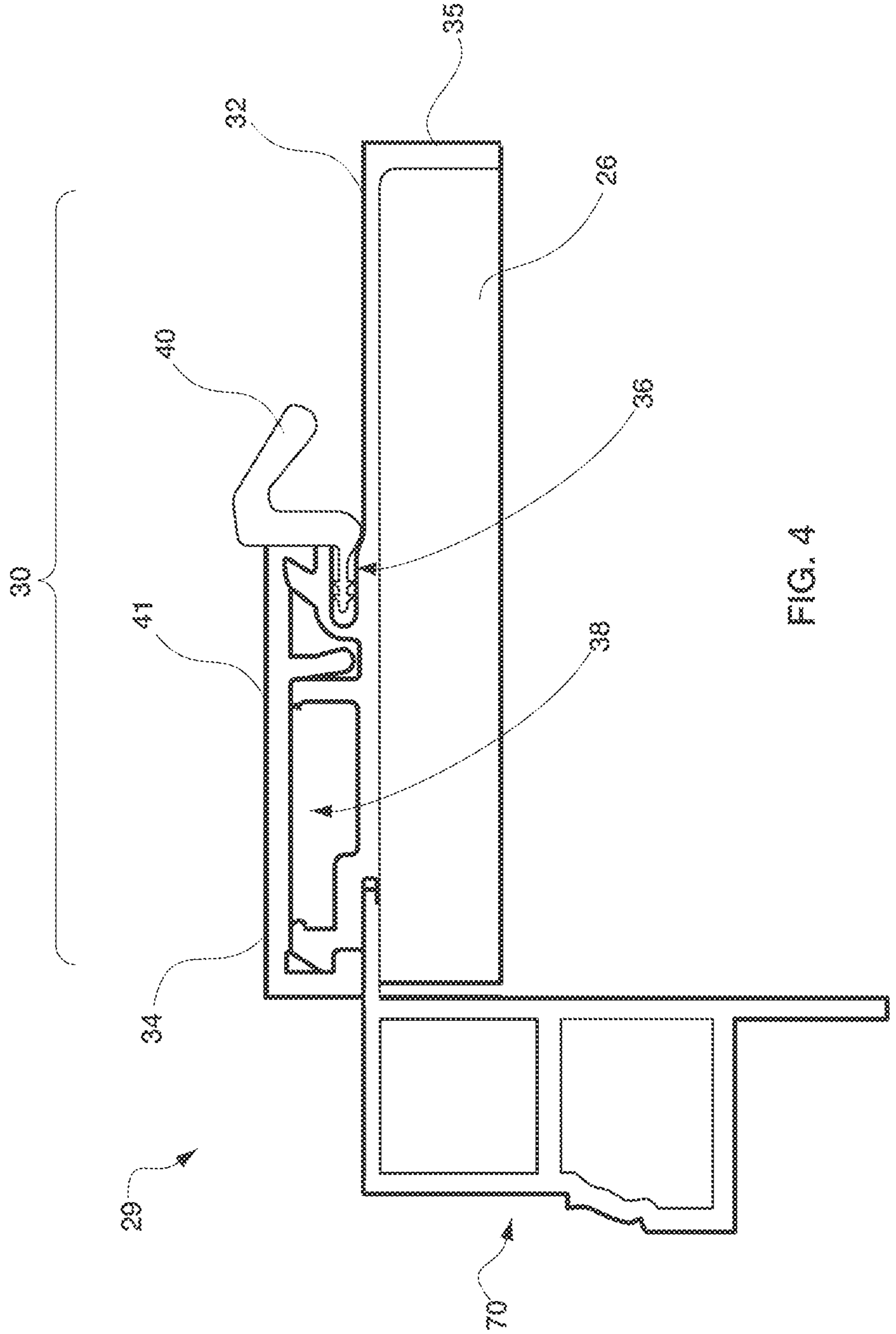
FIG. 4 is another cross-sectional view of one embodiment of a frame member having a core, a trim profile and a top piece.
Figure 4A:
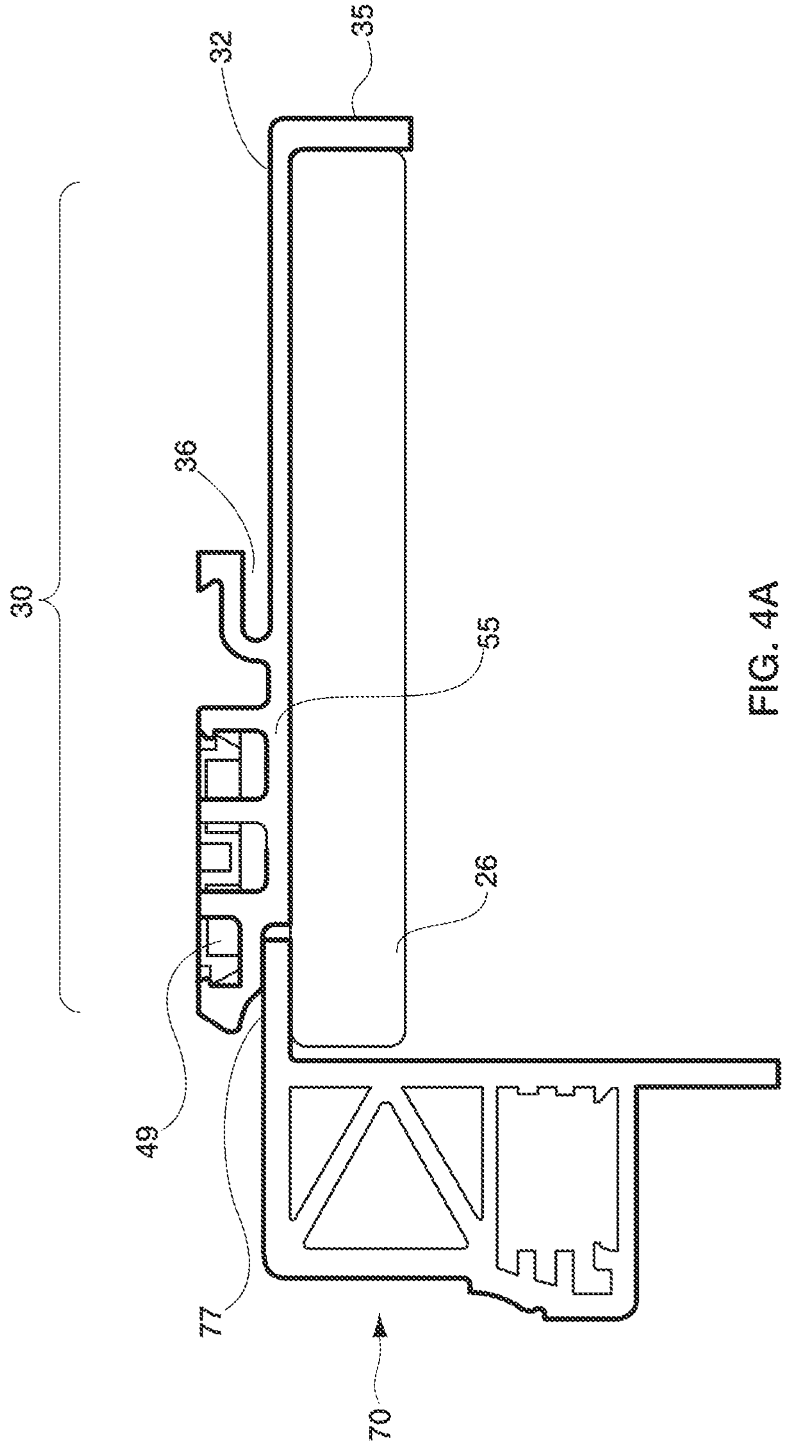
FIG. 4A is a cross-sectional view of one example of the frame member of FIG. 4 with a portion of the top piece removed.

Turning to FIGS. 2-3, and in some examples, the frame member 29 may include a core 26 and a top piece 30, as seen in FIGS. 2 through 4, and generally throughout the figures. The top piece 30 may include a binder (not shown) that attaches it to the core 26. The binder may be an adhesive. In one embodiment, the binder may be an adhesive such as a hot melt adhesive. Core 26 may be of a material that provides additional structural stability while top piece 30 can be included, for example, for structural stability and/or aesthetic features. Core 26, may, by way of example, be of wood, part wood, and/or all or part wood/plastic composite, laminated veneer lumber, and/or wood and another material. Top piece 30 may also serve other functions such as protecting the core 26. The core 26 may further include back out grooves 27 (not shown) on a face that is not attached to the top piece 30.

In one embodiment, the top piece 30 may be comprised of one piece. In another embodiment, top piece 30 may be comprised of two joined pieces, a first piece and a second piece, and/or may be comprised of two or more joined, connecting and/or non-joined pieces. Other embodiments of top piece 30 may include additional pieces and/or separate pieces. Still in other embodiments, top piece 30 is a single piece. As shown in the embodiment in FIG. 2, the two piece top piece 30 is, in this embodiment, comprised of a rabbet portion 32 and a separate stop portion 34. In one embodiment, the two top pieces are generally L-shaped. The top piece may be linear and other shapes may alternatively be used.

The core 26 may be of any shape with any defined length ("CL"), width ("CW") and depth ("CD"). The two-piece top members are flexible dimensionally in design and can accommodate any span of core sizes, including multiple cores. In one embodiment the core width is about 5¼ inches. In another embodiment the core width is about 7¼ inches. In another embodiment, the core width may be from about 4" to about 8". Either the rabbet portion 32, the stop portion 34 or both can be adjusted in their respective widths ("RW" and "SW") to accommodate the core's width to maintain the overlap at the proximate ends 31, 33. In a number of embodiments, the rabbet portion 32 is at a fixed standard width while the stop portion 34 can be accommodating and manufactured at a variety of widths. Still, the rabbet portion 32 may also be manufactured at a variety of widths to accommodate the needs of the installation/application.

Figure 2A:
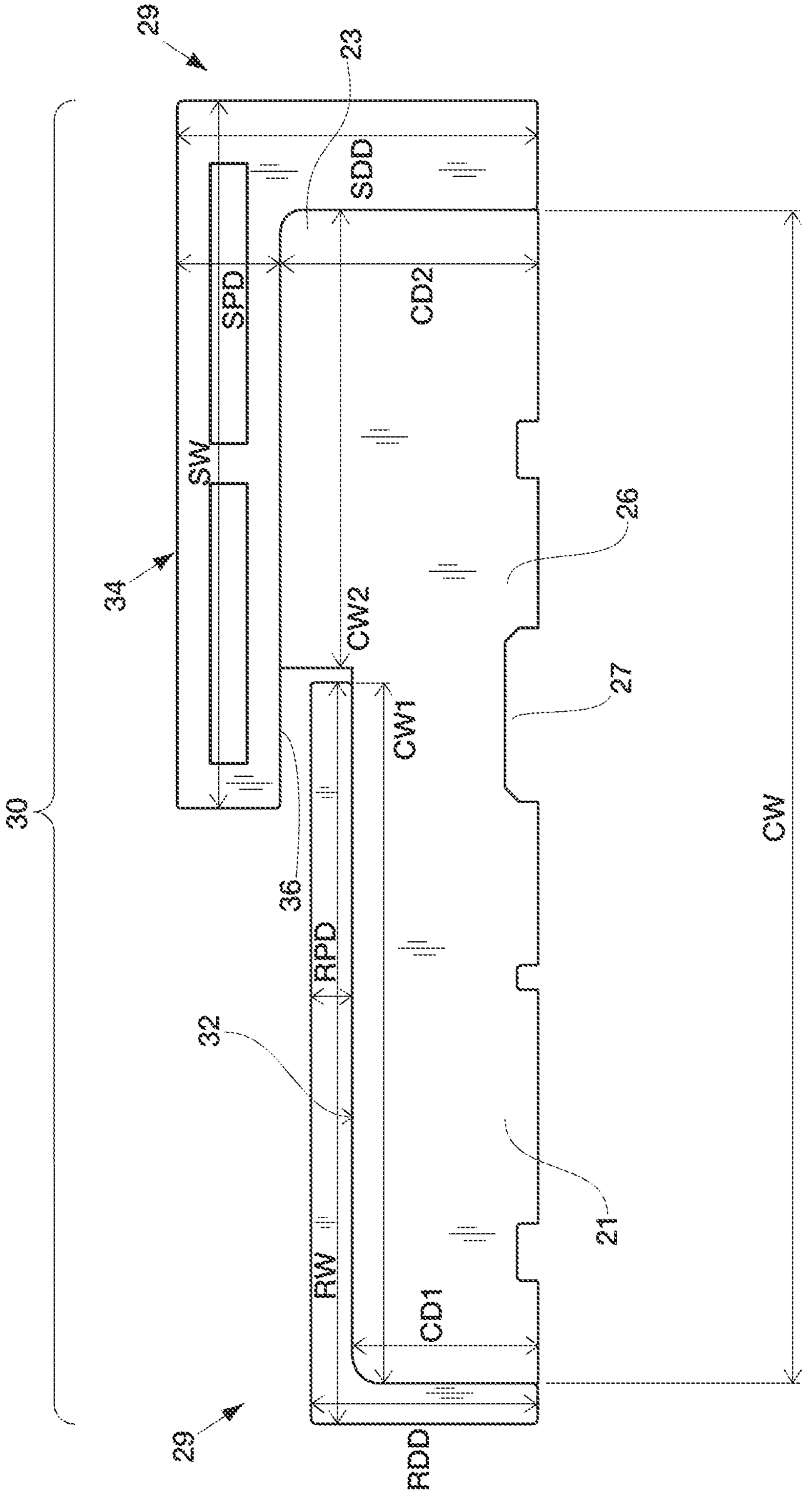
FIG. 2A is an alternative cross-sectional view of one embodiment of the frame member of FIG. 2.

In some embodiments, the core 26 may include a partially raised portion 23 to support at least one of the top pieces. Raised portion 23 may be a portion of the core that is raised, non-linear, in a different plane and parallel to the main core portion. This portion 23 may be integrally formed with the main core from one core material. Alternatively, this portion 23 may be adjoined from separate components to wholly form the core 26. In the embodiment shown in FIG. 2A, the core 26 has a first portion 21 (having a length ("CL1"), width ("CW1") and depth ("CD1")) to support the rabbet portion 32. The core may also include a second raised portion 23 (having a length ("CL2"), width ("CW2") and depth ("CD2")) to support the stop portion 34. The first and second portions of the core 26 may be of any length, width and depth. The second raised portion 23 of the core 26 may enable the stop portion 34 to at least partially overlap the rabbet portion 32. In yet other embodiments, the first and second portions of the core are attached to a single top piece molded to fit both portions of the core 26.

FIGS. 2 through 4 show that the top piece may include an overlap and form a slot 36. The slot 36 may be a weather strip slot that further includes a weather strip 40. Weather strips are useful for preventing water and air from entering the interior of a building. The slot 36 may accept the weather strip between the proximate ends 31 and 33.

In some embodiments, where the stop portion 34 extends over the rabbet portion 32 to form an overlap, the rabbet portion 32 and stop portion 34 of the top piece 30 embodiments may overlap in any number of configurations. In one embodiment, the proximate end 33 of the stop portion 34 overlaps with a corresponding proximate end 31 of the rabbet portion 32. In some examples, the proximate end 33 of stop portion 34 meets the proximate end 31 of rabbet portion 32 by about an overlap of about 0" to about ½".

Still in other embodiments, the overlap may be substantially medially located over the core. The location of the overlap with respect to the core 26 may depend on the dimensions of its portions, particularly CW1 and CW2. In some embodiments, CW1 and CW2 may be of widths such that the overlap is closer to a distal end 35 of the rabbet portion 32 than a distal end 37 of the stop portion 34. In other embodiments, the overlap is closer to the distal end 37 of the stop portion 34 than distal end 35.

The extent of overlap may also depend on the depths and widths of the rabbet and stop portions of the top piece. In one embodiment, the stop portion 34 has a greater width ("SW") than the width of the rabbet portion 32 ("RW"). In another embodiment, the proximate end 33 of stop portion 34 has a greater depth ("SPD") than the proximate end 31 of the rabbet portion 32 ("RPD").

The top piece/pieces may also sit on top of the core 26 in a variety of configurations. As shown in FIG. 2, the distal ends 35, 37 of the rabbet portion 32 and stop portion 34 both overlap the sides of the underlying core 26. In one embodiment, the depth of the core ("CD1/CD2"), at least at the core's greatest depth, is greater than the depths of the distal ends 35, 37 of the rabbet portion 32 ("RDD") and stop portion 34 ("SDD"). In other embodiments, the depths of the distal ends 35 and 36 are equal to or greater than the depth of core 26. Furthermore, the depth of distal end 37 may be greater than distal end 35.

In other embodiments, the core 26 is non-metallic. By way of example, the non-metallic material may be wood. The core 26 may also further include a decay resistant material. Decay resistant materials are useful for extending the lifespan of the core, such as through preventing water damage. In one embodiment, the decay resistant material may be a cellulosic-plastic composite. The cellulosic portion of the composite may be wood fiber. The plastic portion of the composite can be a thermoplastic such as polyethylene. In other embodiments, the entire core may include a decay resistant material. The core may include a first portion made of a first material and a second portion made of a second material. The first material may be a material different from the second material.

Figure 10:
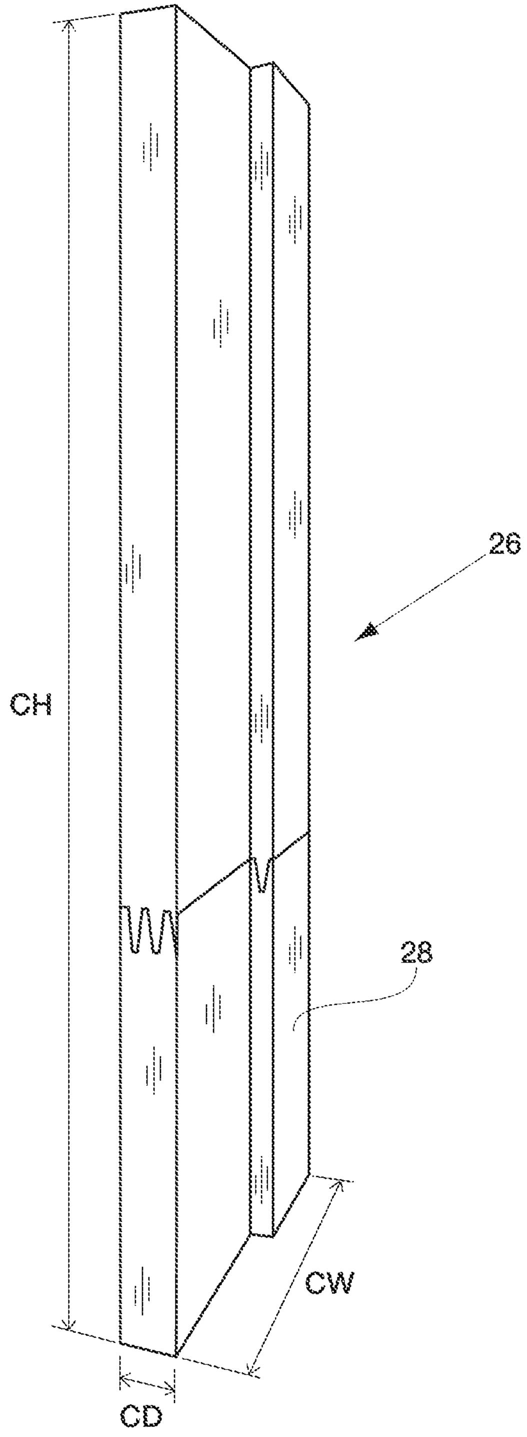
FIG. 10 is a side perspective view of one example of a frame member having a lower portion.

As seen in FIG. 10, the decay resistant material may be generally located on a lower portion 28 of the core. The lower portion 28 of the core may generally refer to a portion that is closer to the ground. The lower portion 28 may be an integrally formed segment as depicted in FIG. 10. This segment can be an extruded profile that matches the profile of the wood core. In the embodiment shown in FIG. 10, the integral segment is joined to the core 26 by a finger joint. However, the decay resistant material may be joined to the core 26 by any mechanical or chemical means and is not limited to connecting via a particular type of joint. Further, the integrally formed segment may be of any length with respect to the core. By way of example, the length of the segment may be about 4". In some examples, the lower portion 28 may be formed of foamed PVC.

The top piece 30 may also be a decay resistant material. This decay resistant material may be a cellulosic-plastic composite. In one embodiment, the cellulosic portion of this composite is a wood fiber. In another embodiment, the plastic portion of the composite is a thermoplastic such as polyvinyl chloride. In some examples, the top piece may be a resin and filler combination material.

The amount of cellulosic material may vary within the top piece composite. In one embodiment, the top piece composite is between about 20 weight percent and about 70 weight percent of the weight of the cellulosic-plastic composite. In another embodiment, the amount of cellulosic material within the composite is about 35 weight percent of the total weight of the cellulosic-plastic composite. The thickness of the top piece 30 may also vary among different embodiments of the invention. In one example, the thickness of the top piece 30 is between about 10% and about 50% of the thickness of the total frame member, including the core. In one embodiment, the thickness of the top piece 30 is about 30% of the thickness of the door frame member 29.

Figure 11:
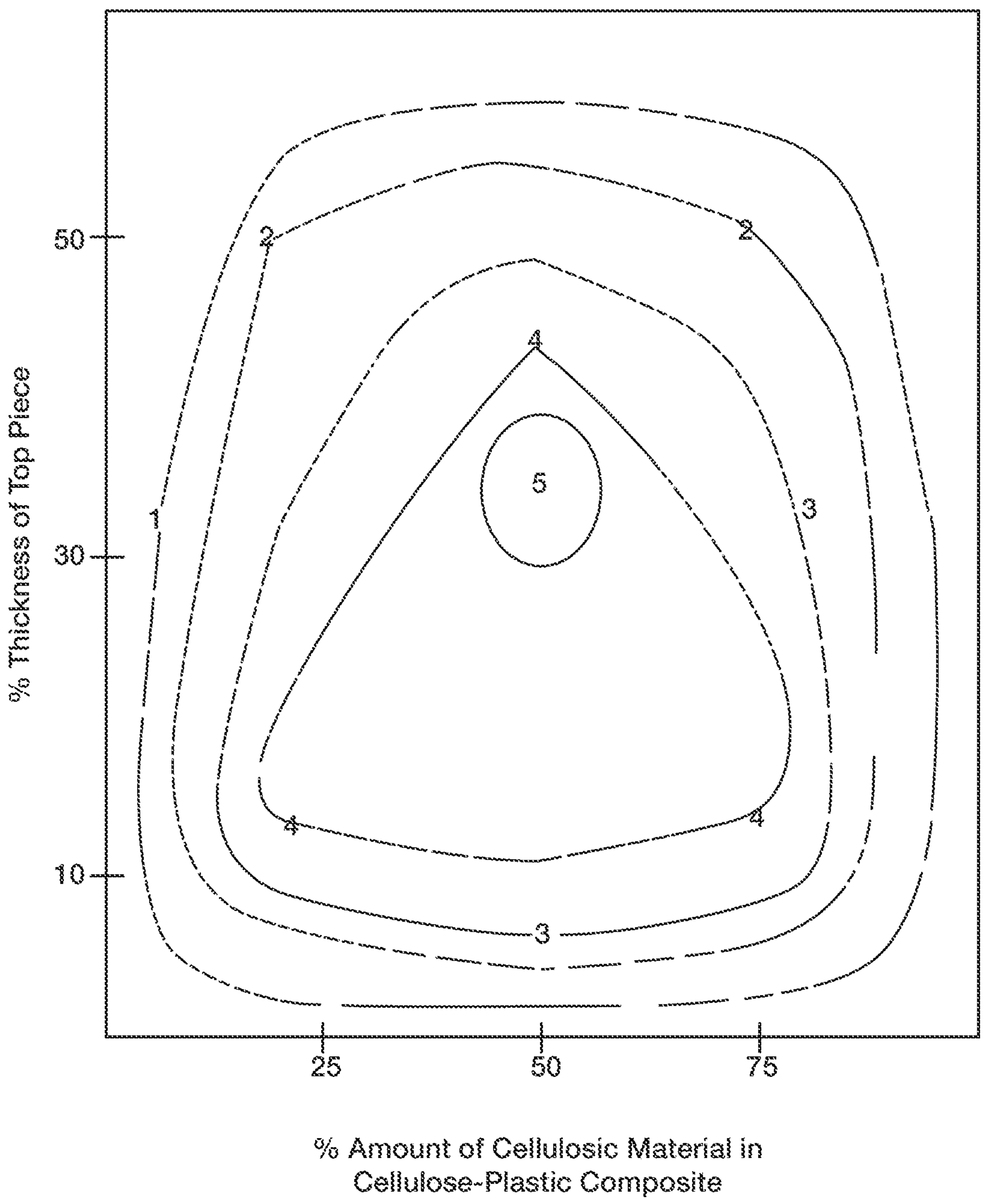
FIG. 11 is a graphical representation of a response surface illustrating the relationship of the thickness of the top piece and the amount of cellulosic material in the cellulose-plastic composite on the performance of a frame member constructed according to some examples of the present disclosure.

FIG. 11 is a graphical representation of a response surface illustrating the relationship between the percent thickness of the top piece and the amount of cellulosic material in embodiments where the top piece is a cellulosic-plastic composite. Percent thickness of the top piece is defined as the thickness of the top piece with respect to the total thickness of the frame member. The response surface provides a visual illustration of the effects of both thickness and percent amount of cellulosic material within the composite via a two-dimensional surface plot of a three-dimensional surface. The boundary conditions in FIG. 11 are denoted with dashed lines, and indicate a minimum percent thickness and a percent amount of cellulosic material for use with some examples within the present disclosure.

Accordingly, in this example, the expected characteristics of various embodiments of top piece 30 were plotted and zones on the response surface were ranked from 1 to 5, with 1 being the poorest performing top pieces and 5 being the best performing top pieces in terms of strength, durability and resistance to decay.

FIGS. 3-4 show top piece 30 may include at least one hollow cavity 38. More than one hollow cavity may be separated by a support rib 39. Top piece 30 may include both a horizontal hollow cavity **38*a* spanning longitudinally along the length of the top piece and a vertical hollow cavity 38*b* spanning along the depth of the top piece. Cavity 38 may allow for placement of items such as installation anchors and/or level indicators 49. Hollow cavity 38 inclusion in top piece 30 may allow for more consistent extrusion of top piece 30. The hollow cavities 38 may span the entire width of the top piece 30. The frame member may include a series of hollow cavities included in top piece 30**.

Figure 3A:
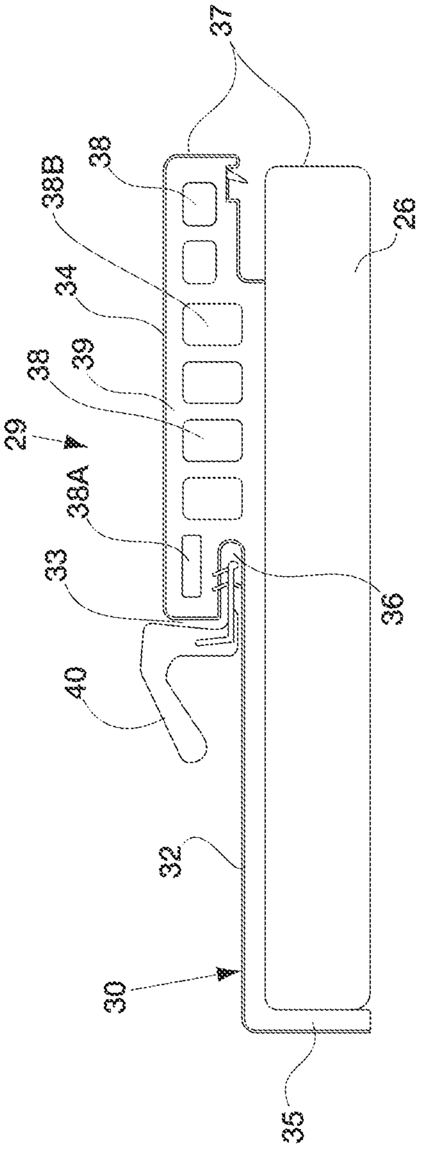
FIG. 3A-3B show another cross-sectional view of embodiments of a frame member having a core, trim profile and a top piece.
Figure 3B:
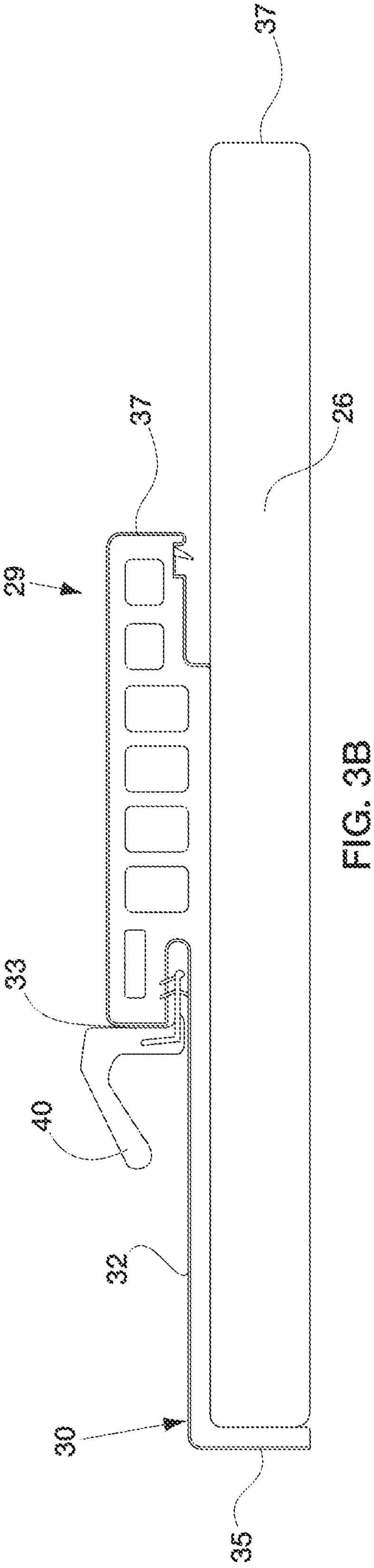

In some embodiments, as seen specifically in FIGS. 3A and 3B, the top piece 30 may include a seal 97. The seal 97 may be a projection into recess 99. The seal 97 may be a flexible seal. The seal 97 may be co-extruded with top piece 30. The seal 97 may form a barrier to entry of water and weathering at the juncture between the top piece 30, other parts of the frame member 29 and the flange 77.

Figure 5A:
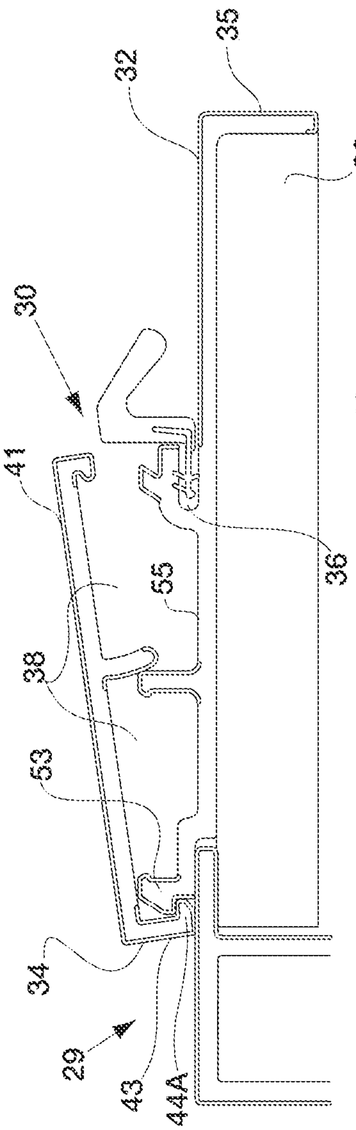
FIGS. 5A-5C shows one embodiment of an outer leg configuration of one example of a top piece according to the present disclosure.
Figure 5B:
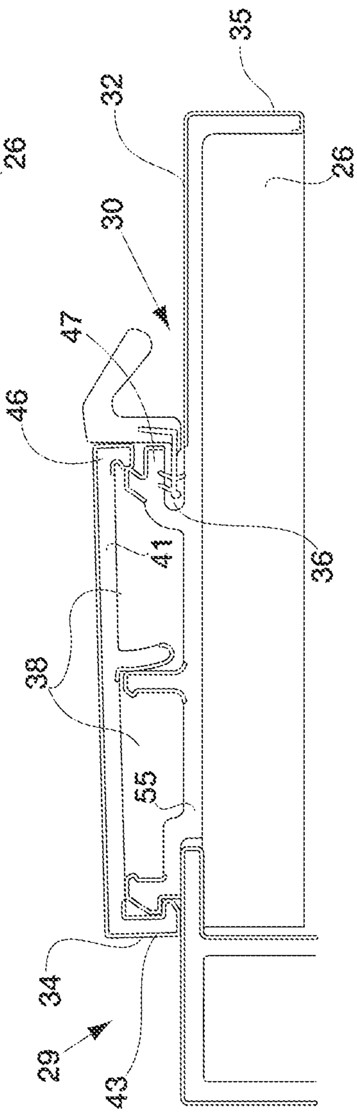
Figure 5C:
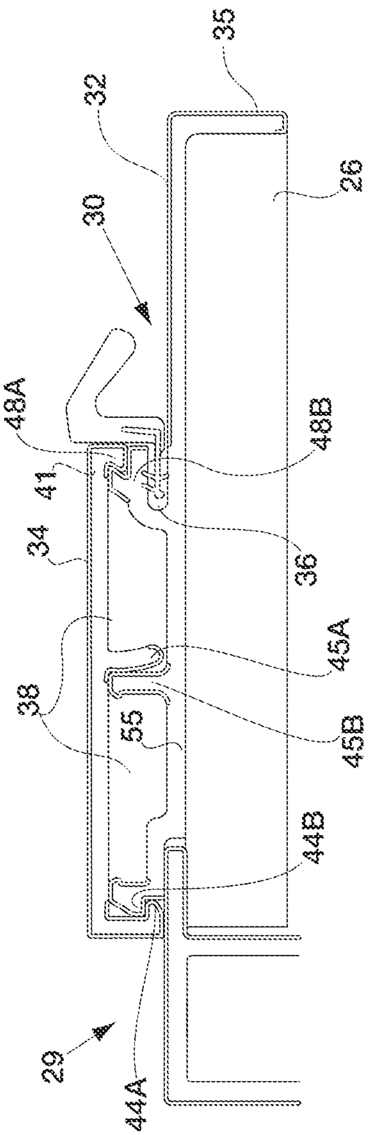

Top piece 30 may also, in some embodiments, include a top piece cover 41. The top piece may also include a top piece base 55 (see FIGS. 4-5C). The top piece base may include, by way of example, a part of the rabbet portion 32 that houses, is covered by and/or interfaces with the top piece cover 41. The top piece cover 41 may interface with top piece base 55 and rabbet portion 32 to form the complete top piece, however, in some examples the rabbet portion and stop portion 34 formed by interface of the cover 41 may be separate pieces. FIGS. 5A-C show examples of a top piece base 55 interfacing with top piece cover 41. In one example, an outer leg 43 of the cover 41 hooks/mates with the outer leg 53 of base 55. The outer leg of the cover 41 may include a lip 44A. The outer leg 53 of base 55 may include a lip 44B. The outer leg lip 44A and the top piece lip 44B may overlap to secure the cover 41 to the base 55. A mid leg 45A of the cover may contact with a mid leg 45B of the base. The interaction of the mid leg of the cover 45A and the mid leg 45B of the base may cause the cover to bias in one direction, away from the interface of the outer leg lip 44B and the cover lip 44A, further securing the interface between the outer leg lip and the cover lip. The cover 41 and the base 55 may also both include an inner leg 46, 47. Each of the inner legs may include an inner leg lip 48A, 48B. The inner leg lip 48A of the cover 41 may snap and/or slide onto the inner leg lip 48B of the base 55, securing the cover 41 in place on the base 55. The top piece in this example may be considered a top piece assembly including a core 26 and a top piece 30, with the top piece including a rabbet 32 and a stop 34. The stop 34 may include a base 55 and a cover 41. The cover 41 may secure onto the base 55 such that the cover and the base form the stop face. The cover 41 and the base 55 may form at least one or more hollow cavity 38.

Figure 4B:
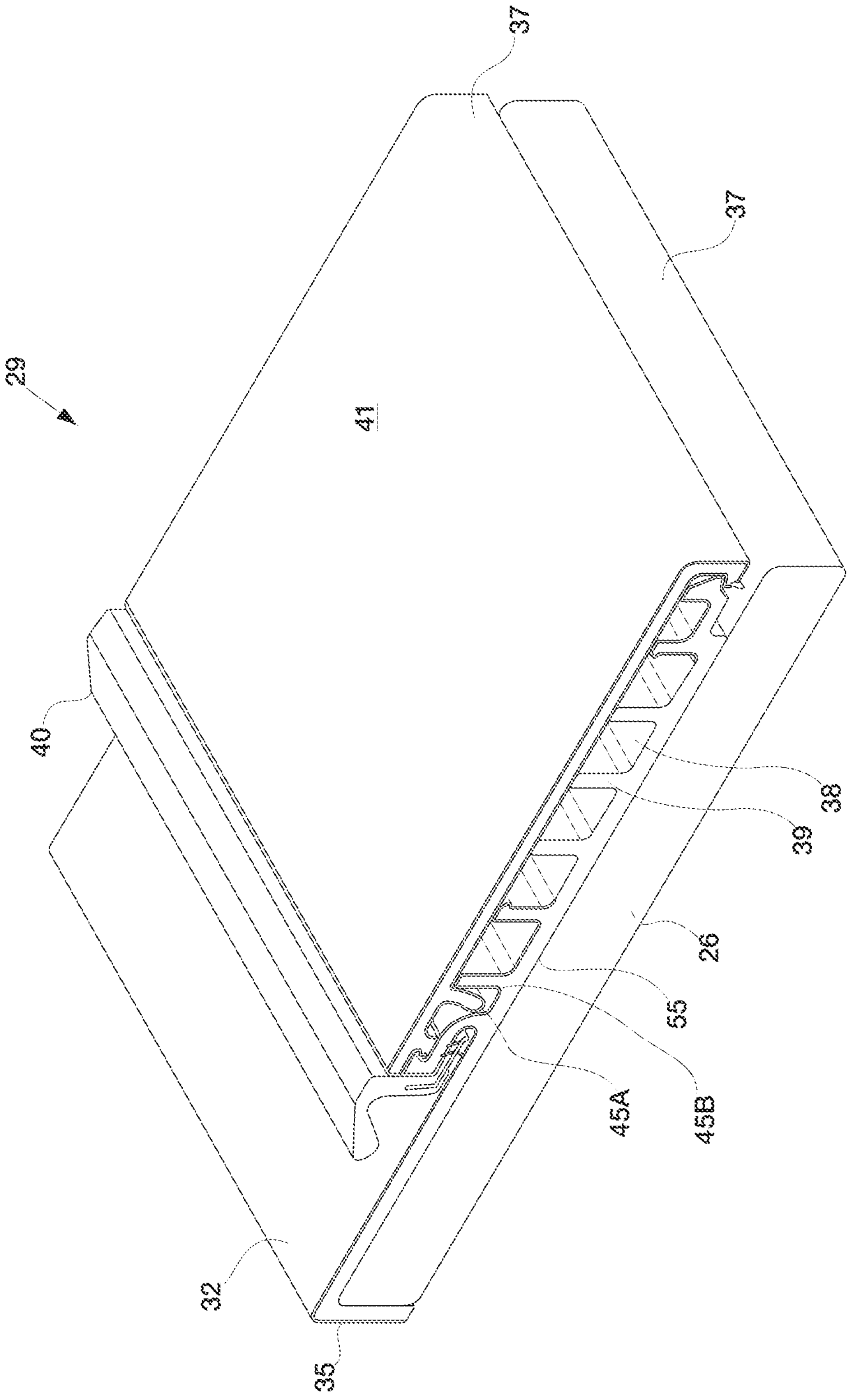
FIG. 4B is a perspective view of one embodiment of a frame member having a level assembly.
Figure 4C:
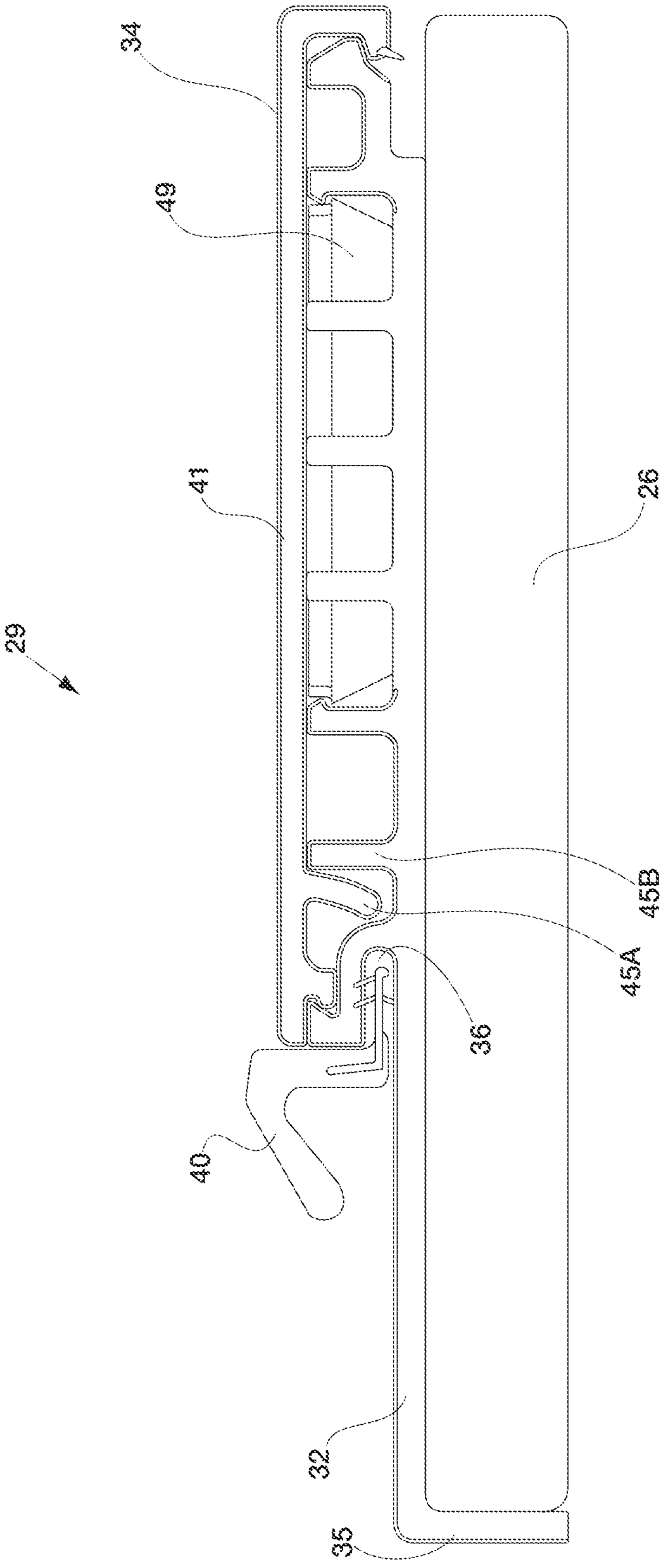
FIG. 4C is a cross-sectional view of one embodiment of the frame member of FIG. 4B having a level assembly.
Figure 4E:
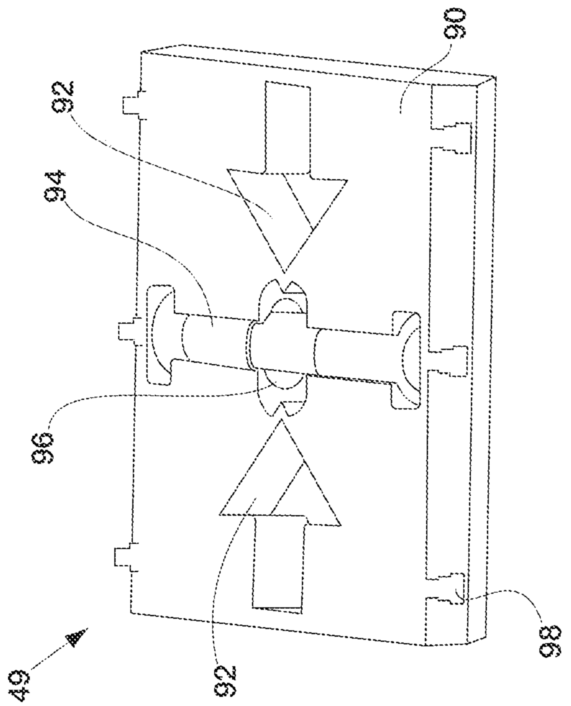
FIGS. 4D-F show various views of the level assembly of FIG. 4B.
Figure 4D:
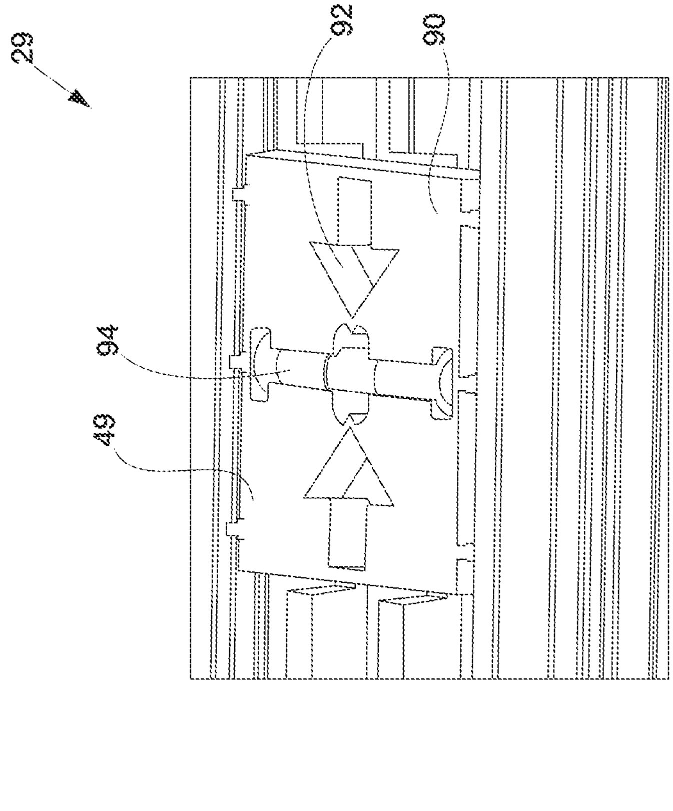
Figure 4F:
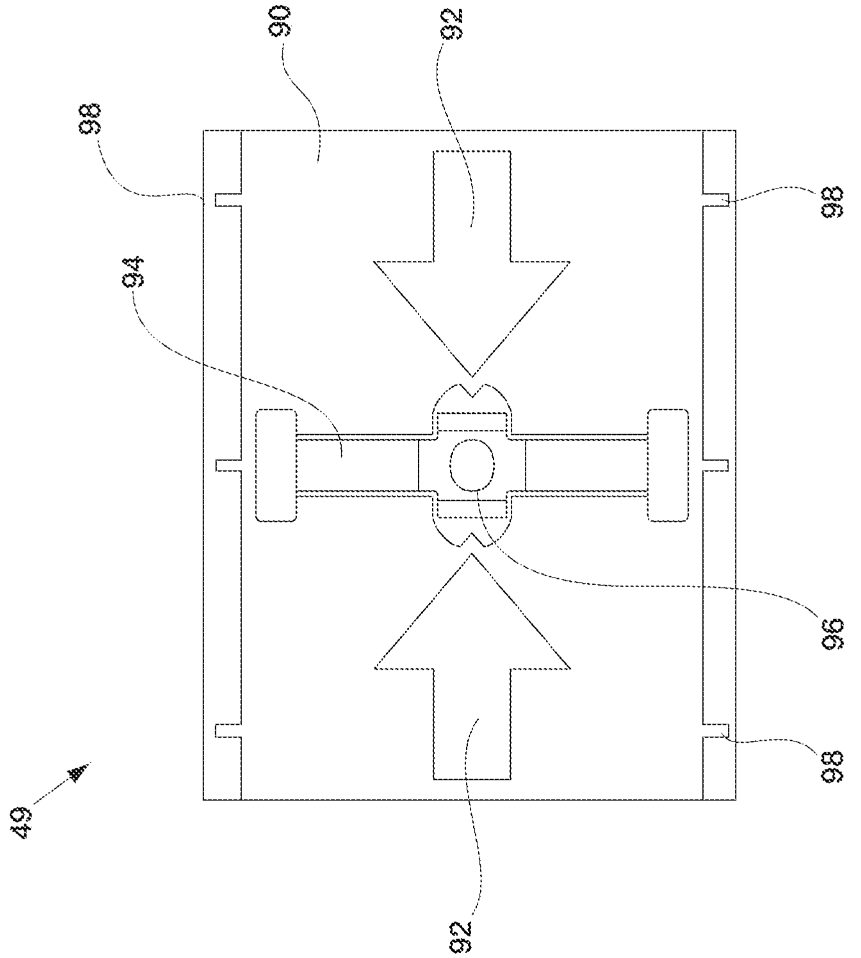

A level assembly 49 may be situated in the hollow cavity 38 between the top piece base 55 and the top piece cover 41. The hollow cavity can be formed by removing ribs 39 as needed, by machining. FIGS. 4B-4D show examples of a level assembly incorporated in a frame member. The level assembly may be of a height and of dimensions to be accommodated within the hollow cavity 38. The top piece cover 41 and the top piece base 55 may enclose the level assembly 49. The level assembly may include a body 90, fittings 98 along the perimeter of the body 90, a level site 94, a bubble level 96 and indicators 92.

Figure 5D:
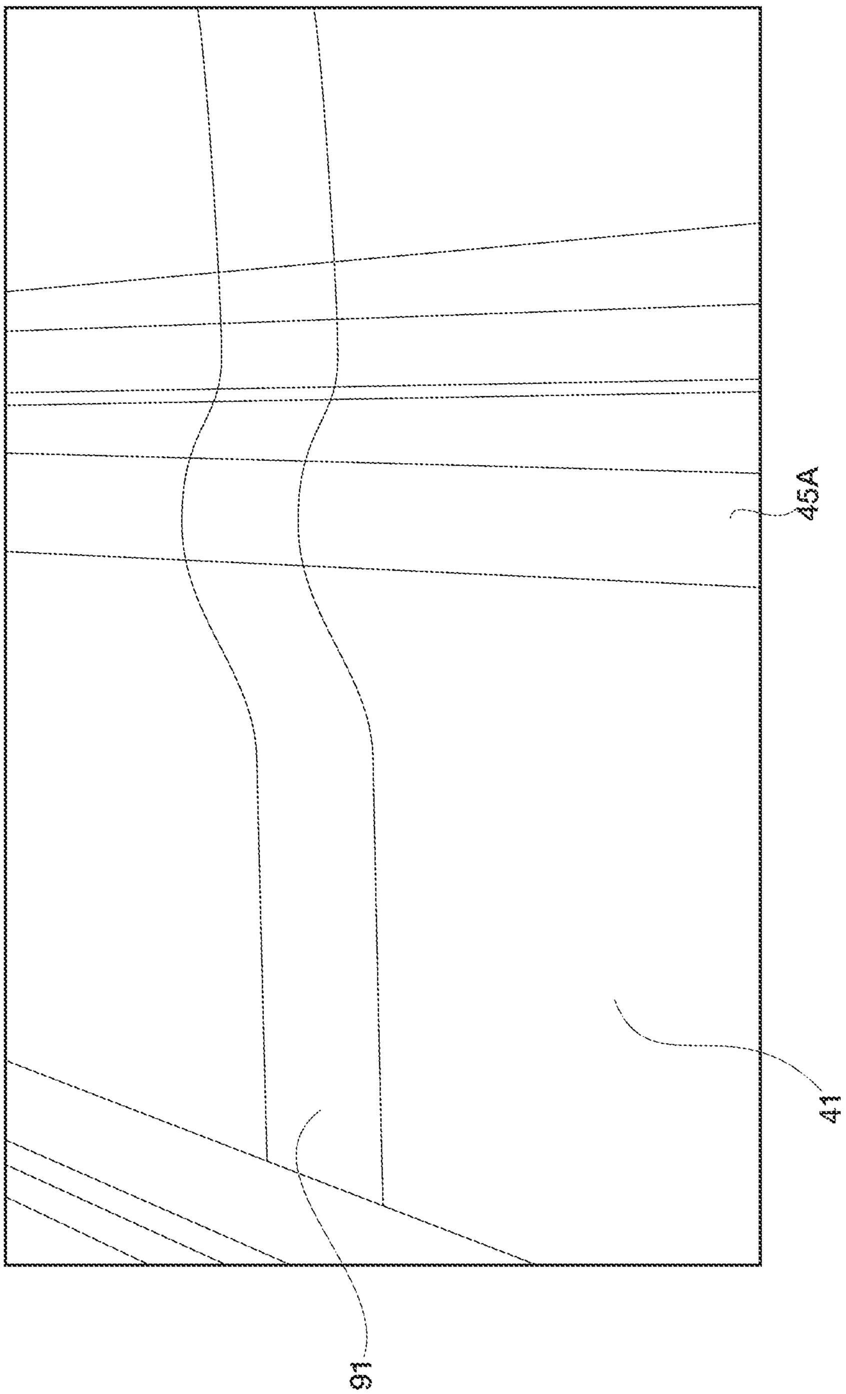
FIG. 5D is a perspective view of one embodiment of a frame member including a pull according to the present disclosure.
Figure 5F:
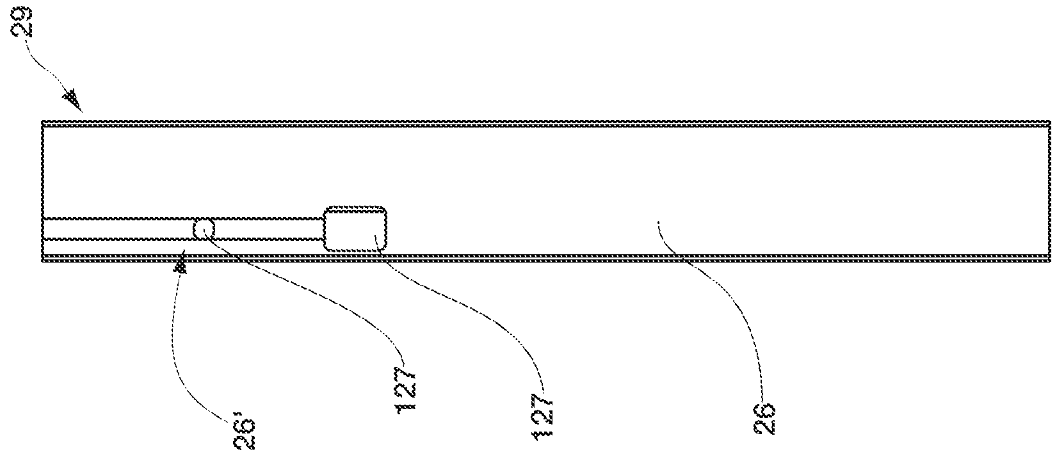
FIGS. 5E-F show various views of an embodiment of a frame member according to one example of the present disclosure.
Figure 5E:
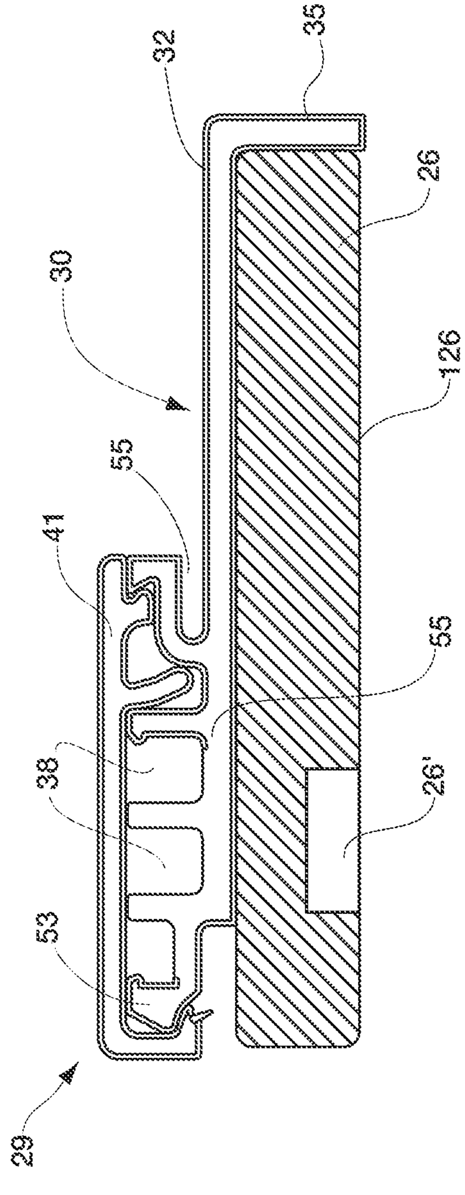

One example of a door assembly may include a pull 91 fitted between a removable top piece cover 41 and a top piece base 55 to assist with removal of the top piece cover 41 from the top piece base 55 (as seen in FIG. 5D). The pull 91 may be made of a durable material, by way of example, the pull may be a mylar pull. The door assembly may include multiple pulls. A pull 91 may be configured across a width of the top piece cover. A pull 90 may be attached to an underside of a cover 41, in one example, by an adhesive 93. The pull 90 may span from one underside edge of the cover to another underside edge of the cover and extend outside of the cover between the cover and the base to be exposed on the outside of the door frame member. The pull is thin enough to not impede the closure of the cover 41 onto the base 55, and may be fitted between a mid leg of the cover 45A and a mid leg of the base 45B without interrupting the biasing position exerted by the placement of the mid legs 45A, 45B. The pull is also strong enough to withstand repeated removal of the cover by way of tension on the pull 91.

Frame member 29 may also include, in some examples, trim profile 70, as seen in FIGS. 2 through 4. Trim profile 70 may be incorporated as a part of the frame member in any of a variety of ways and may take on a variety of shapes. Trim profile 70 may be a one piece trim profile. Trim profile 70 may include multiple portions, segments, and/or attachments. Trim profile 70 may take on a vertical orientation and be adjustable relative to the jamb portion of the frame member 29.

FIGS. 5E-H show examples of a door assembly having a door frame 10, the door frame including a plurality of frame members 29. At least one frame member 29 may include a core 26, a two-piece top piece 30, a removable top piece cover 41, and a storage compartment 26' formed within the at least one frame member. The two-piece top piece 30 may include one or more hollow cavities 38. The storage compartment 26' may be formed within the hollow cavities 38 in one example. The storage compartment 26' may be adapted to house components. The components may offer accessory options. The storage compartment 26' may be accessible when the removable top piece cover 41 is removed.

Figure 5G:
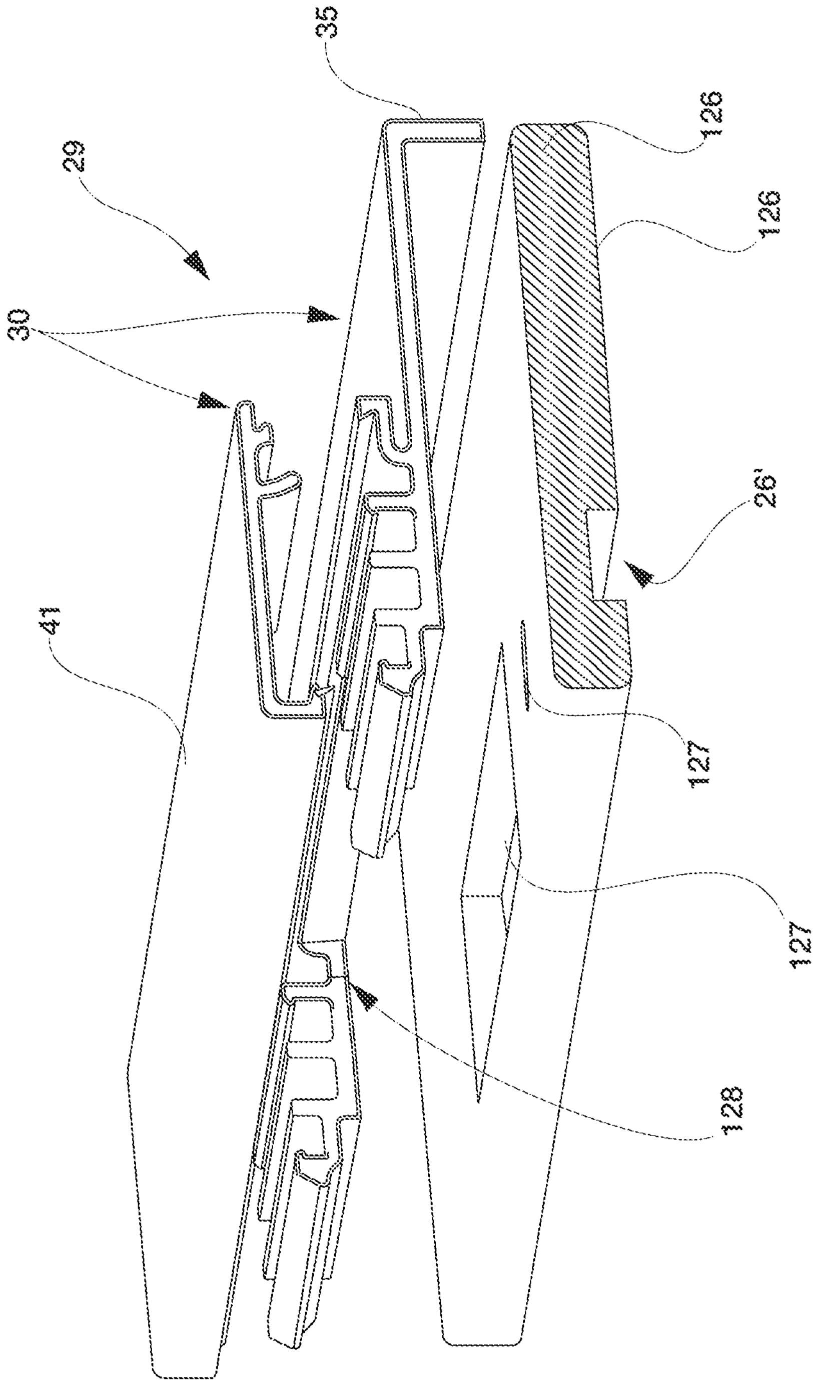
FIGS. 5G-H show an exploded view of the frame member according to FIG. 5E.
Figure 5H:
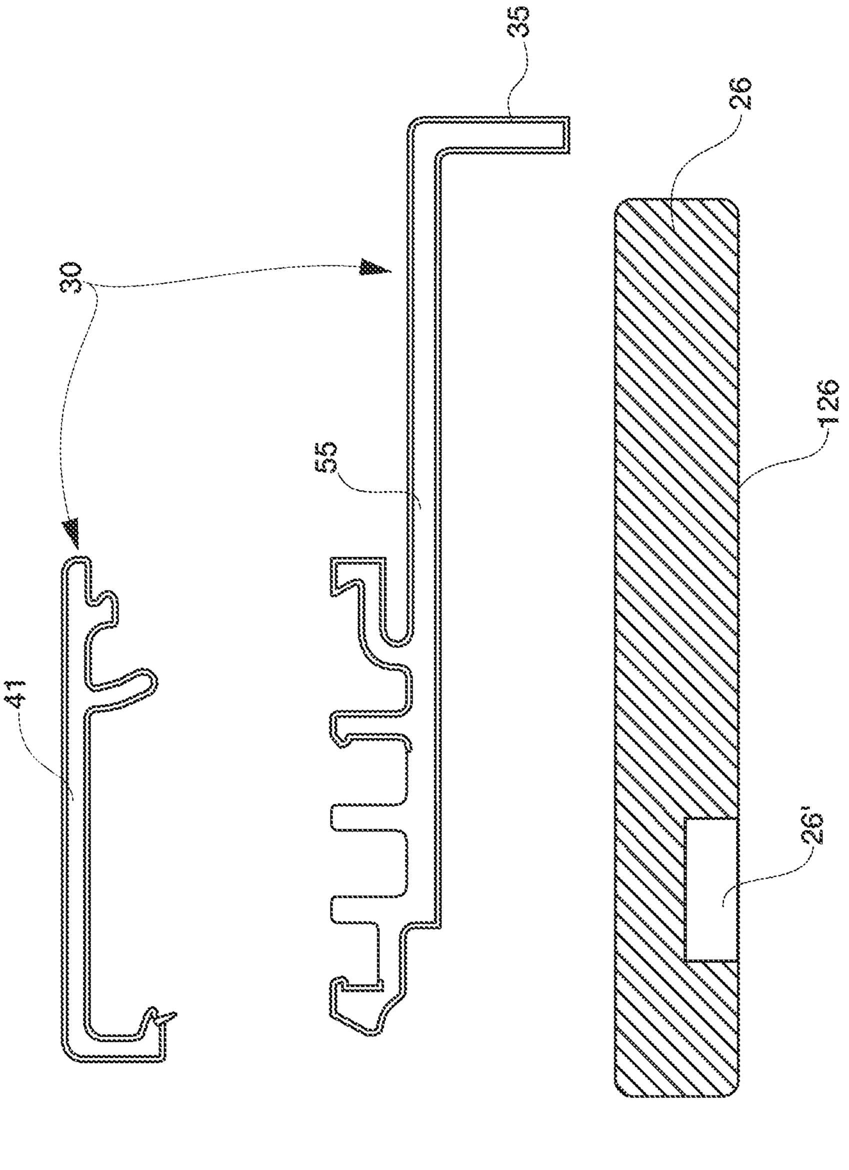

The storage compartment 26' may include a groove formed in the core 26. The storage compartment 26' may be a channel formed in the core 26. The storage compartment 26' may take on any shape. The storage compartment 26' may form a channel along an interior surface 126 of core 26. The storage compartment 26' may include openings 127. The openings 127 may provide an opening from an interior surface 126 of the core 26 through to and providing access through the core 26 to the top piece 30. The storage compartment 26' may include a channel formed in the core 26 including one or more openings 127 that extend from an interior of the core 126 to the top piece 30, in some examples extending to the hollow cavities 38, also being a part of the storage compartment 26'. The hollow cavities 38 may, in certain examples, provide pathways for wiring and components to be stored and to reside, and the openings 127 providing access by wiring and connections to the hollow cavities 38. Wiring may be considered part of a component. Visible in FIG. 5G is an excerpt 128, creating a break in the frame member top piece base. The excerpt making the base a discontinuous base with the breaks occurring along the length of a frame member. The excerpt may work together with an opening 127 to form a compartment space for a component to be housed within the frame member.

Figure 5I:
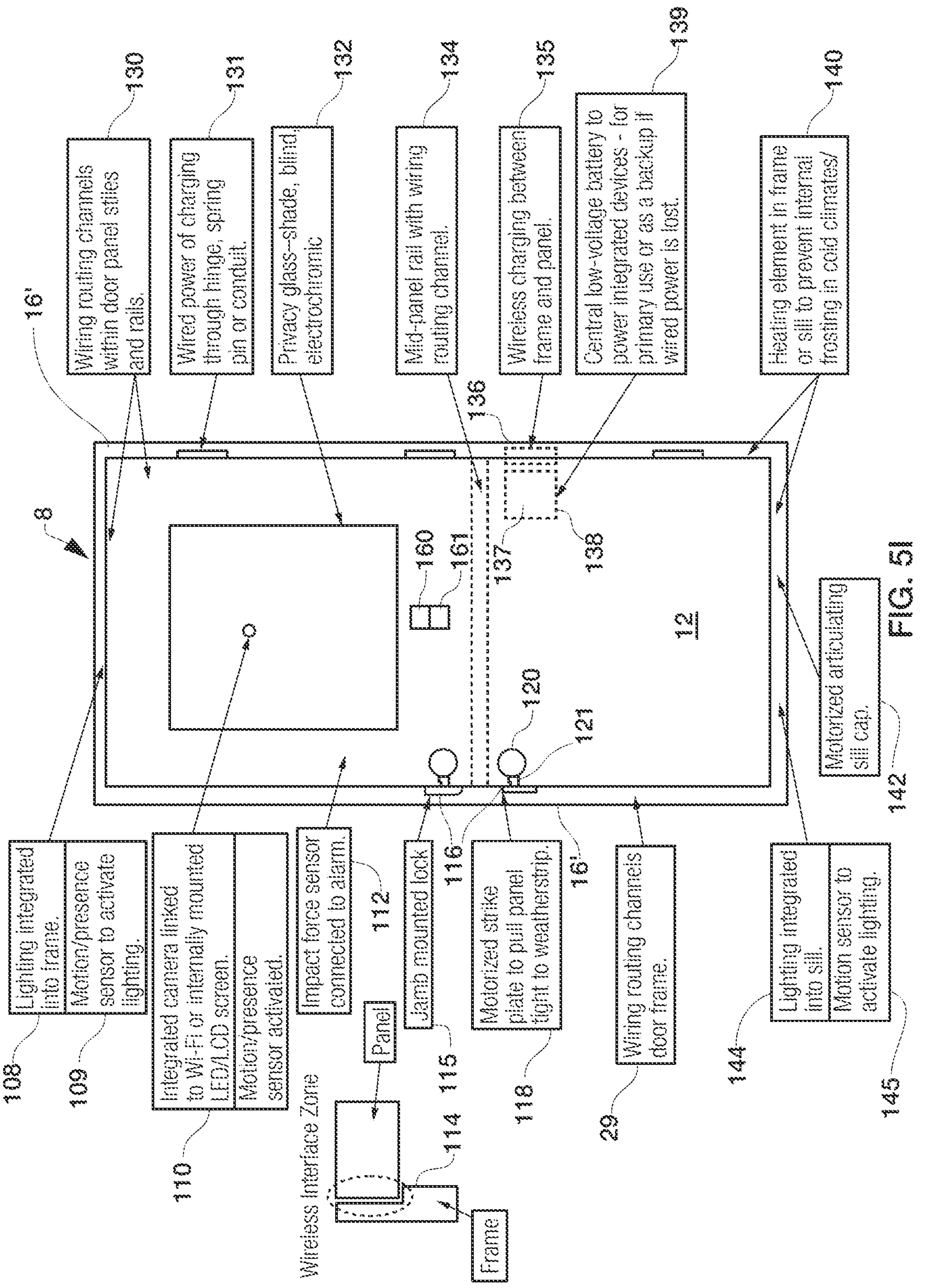
FIG. 5I shows a diagram of various accessory options with the frame member 30 according to FIG. 5E.
Figure 5J:
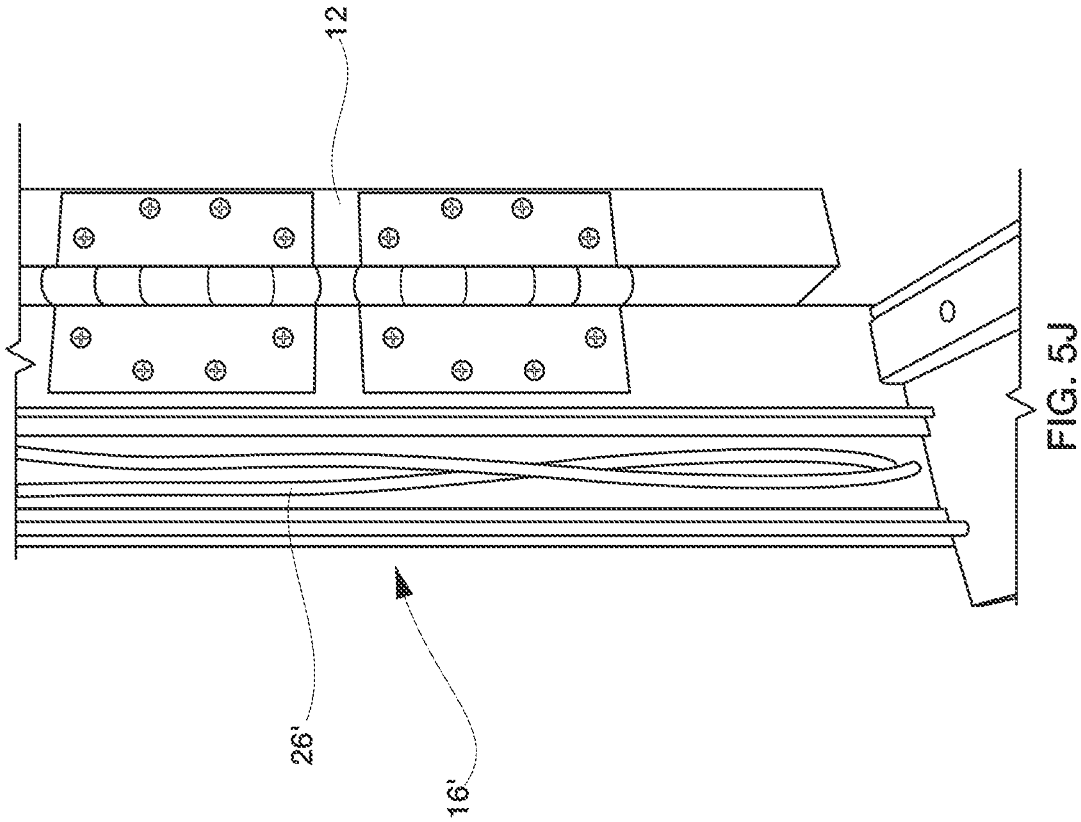
FIGS. 5J-L show examples of frame members according to inventions of the present disclosure.
Figure 5L:
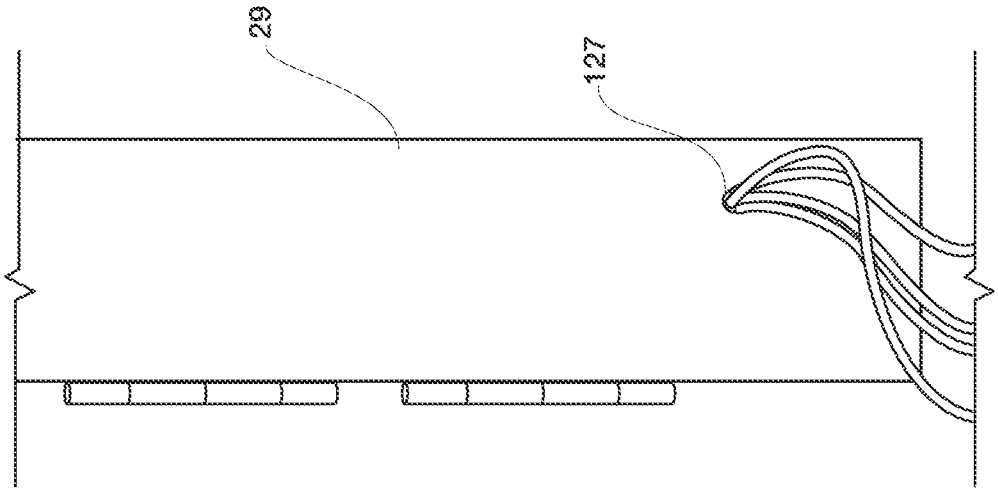
Figure 5K:
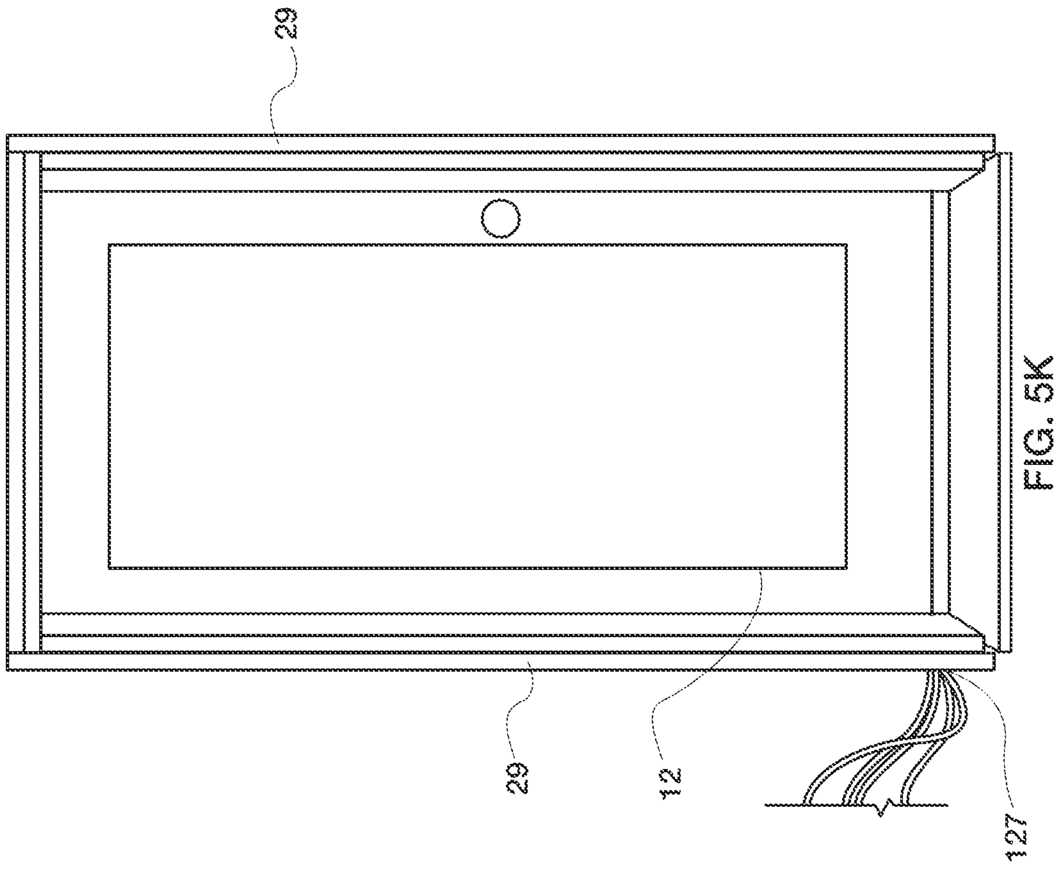
Figure 6:
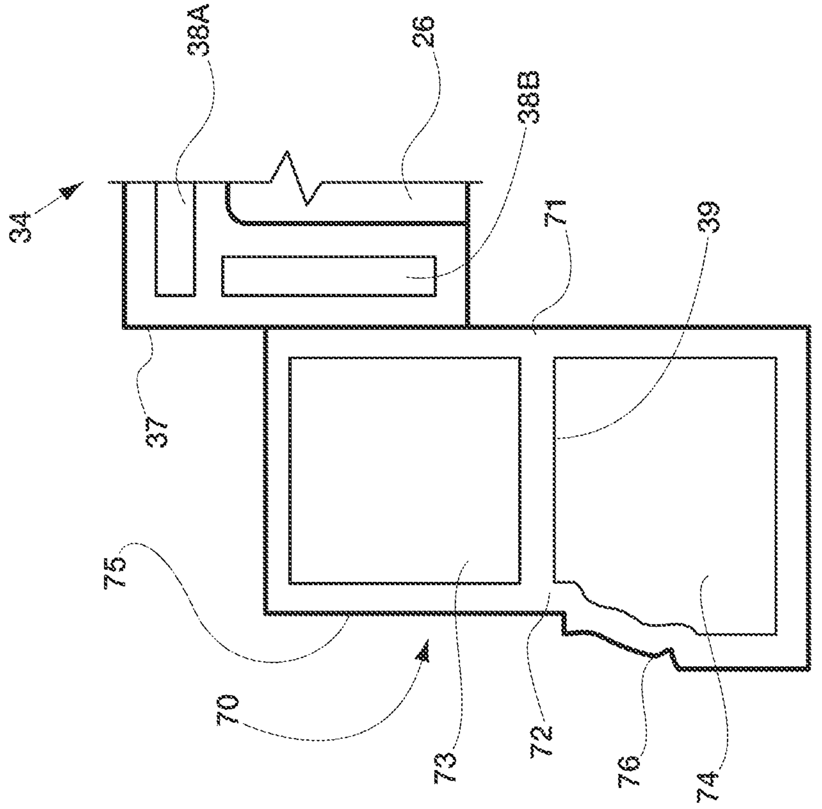
FIG. 6 is one example of a trim profile constructed according to the present disclosure.
Figure 7:
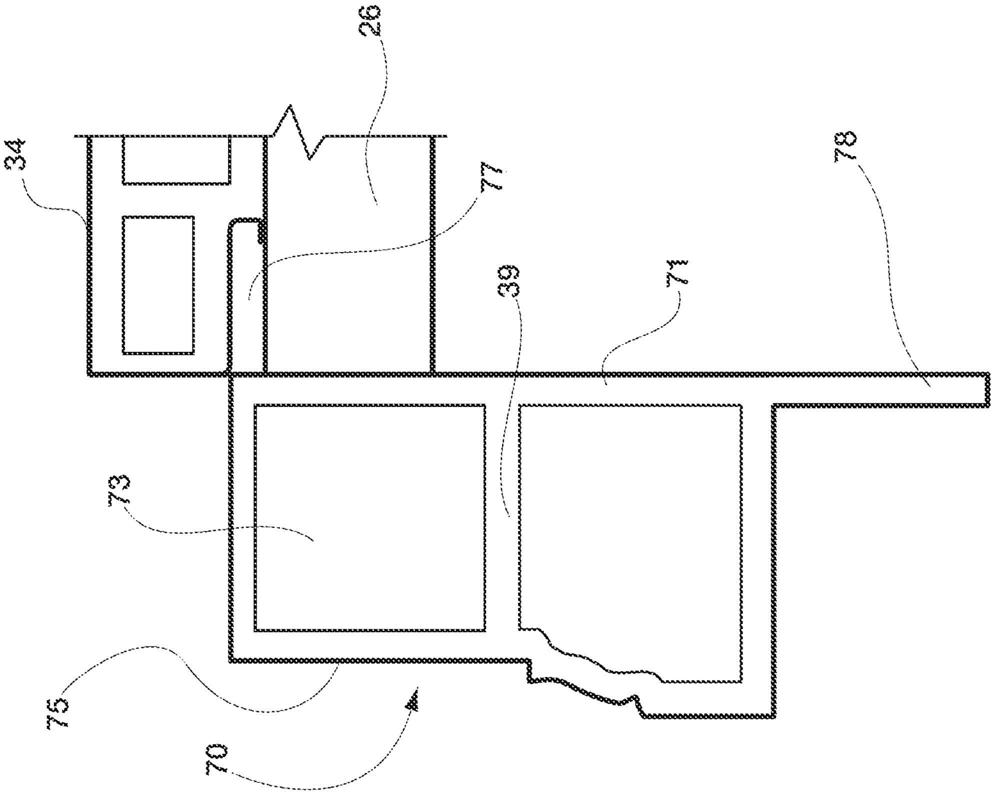
FIG. 7 is another example of a trim profile constructed according to the present disclosure.

FIG. 5I shows one example of a door assembly 8 including a door panel 12, a frame 16' and a sill. The door panel 12 includes a locking mechanism 116 that is configured to secure the door panel 12 in a closed position such that one or more components of the locking mechanism 116 is actuated to allow the door panel 12 to be moved from a closed position to an open position. The locking mechanism 12 may include a handle 120 that is configured to transition a latch 121 from an extended position to a retracted position. The locking mechanism 116 may also include a deadbolt having an extended position and a retracted position. The deadbolt may be manually or electromechanically transitioned between the extended and retracted positions, e.g., with a lever or a key, a rotational motor, a linear actuator, and/or or a solenoid.

In some examples, the locking mechanism 116 is disposed substantially within the door panel 12. For example, the handle 120, the latch 121, the deadbolt, and associated mechanisms are installed within the door panel 12 with the strike plates 115, 118 secured to the frame 16'. However, it is contemplated that the locking mechanism 116 may be disposed substantially within the frame 16' such that the latch 121 and the deadbolt extend from the frame 500 into the door panel 100. In such embodiments, the associated mechanism of the latch 121 and the deadbolt would be installed within the frame 16'. Installing the latch 121 or the deadbolt in the frame 16' may reduce components within a door panel 12 allowing room for additional components within the door panel 12 or for aesthetic features of the door panel 12. In some embodiments, the frame 12 includes wire routing channels defined therein. These wire routing channels may be utilized to route wires to components installed within the door frame 16' or to route wires to a location in the door frame 16' before the wire interfaces or passes into the door panel 12 or the sill, or vice versa.

Wiring channels may extend through channels formed in a door panel 12. Several of these components are detailed below and include, but are not limited to, a locking mechanism, a camera, lighting, a microphone, an impact sensor, privacy glass, a battery, a motion sensor, or a heating element. The wire routing channels within the door panel 12 may be within stiles 130 of the door panel, top or bottom rails of the door panel, a transverse rail between the stiles other than the top or bottom rails such as a mid-panel rail 134. The wire routing channels may allow for wires to be routed through the door panel after the door panel is assembled.

In particular embodiments, one or more of the wire routing channels of the frame 16' may include a wire that is in electrical communication with a wire in one or more of the wire routing channels of the door panel 12. The electrical communication between the two wires may be a direct connection such that the two wires are a single continuous wire. In some embodiments, the electrical communication between the two wires is a wireless interface (135) 136/137 such that power and/or data is transferred to or from the door panel 12. In certain embodiments, the wireless interface 136/137 is an inductive interface; however, any suitable wireless interface may be utilized, including, but not limited to, RF or magnetic resonance. The wireless interface 136/137 may form a wireless interface zone 114 and be located anywhere along the frame 16', sill, top of the frame, and/or the hinged/unhinged side of the frame, by way of example.

The frame 16' may include lighting 108/109 integrated into the frame 16', for example in a frame member 29. The frame lighting may be disposed in the top of the frame and/or in one or both of the sides of the door frame. The frame lighting 108/109, 144 may provide constant lighting to the door system 8. In some embodiments, the frame lighting 108/109 provides visual indicia of a status of the door system 8, e.g., closed condition, locked condition, armed condition, open condition. The visual indicia may be represented by a predetermined color, e.g., white, green, or red. In certain embodiments, the frame lighting 108/109 is in communication with a motion or presence sensor 109 that may be configured to detect the presence or approach of a user and activate the frame lighting 108 in response to motion or the presence of a user. The frame lighting may be configured to illuminate one or more other components of the door system 8.

The components may communicate with other components of the door system 8 and may communication with components remote to the door system 8. Components may include components adapted for lighting 108, heating 140, cooling, cameras 110 and visual components, microphone and audio components, mobility 142, battery power 139, privacy 132 and/or security 112, 110, 145.

FIGS. 6 through 9 show enlarged views of examples of a trim profile 70, by way of example, a brick mould. In one embodiment, trim profile 70 may include a linear side 71 that abuts the top piece 30 and/or core 26 and/or a portion of the top piece 30. Trim profile 70 may also include a non-linear side 72. Trim profile 70 may include a first portion 75 and a second portion 76.

First portion 75 may take on an enclosed square or rectangular shape. First portion 75 may have two linear sides that are parallel with each other and with distal end 37. First portion 75 may include one or more hollow portions 73. First portion 75 may be an enclosed portion. First portion 75 may be separated from second portion 76 by a support rib 39. First portion 75 may also include a stop flange 77. Stop flange 77 may be joined to linear side 71 substantially perpendicularly, forming about a ninety degree angle between the flange 77 and side 71. Flange 77 may fit in a recess 99 formed between an underside of the stop 34 and the core 26. The flange 77 may clearance fit with recess 99. The trim profile 70, in one example, may overlap with the stop 34 of top piece 30. The frame member 29 may include reciprocal recesses at both terminal ends of the stop portion 34, by way of example at the distal end 37 and at the proximate end/stop face end 33.

Second portion 76 may include a linear side and a non-linear side. Second portion may include one or more hollow portions 74. Second portion 76 may be enclosed and/or may take on a non-enclosed shape. Second portion 76 may include a flange 78 extending from linear side 71 and projecting beyond portion 76. Second portion 76 may include a projecting segment 78 that forms the termination of linear side 71 on one end. A projecting segment 79 may extend from non-linear side 72 and be separated from the linear side 71 by a hollow cavity/portion 74. Cavity 74 may be formed by projecting segment 79 and may be configured for the cavity of a corner key (not shown) to connect horizontal and vertical pieces at a miter joint.

The trim profile 70 may be at least a two piece trim profile. Trim profile 70 may include a base segment 82 and a cover segment 80. Base segment 82 may form the linear side 71 and may include a flange 77 and/or a recess 83. Cover 80 may adjoin base segment 82. Cover 80 may include a lip 84 that fits into recess 83 to secure cover 80 to base segment 82. Trim profile 70, in this example, may include a horizontally oriented hollow portion 74 and/or a vertically oriented hollow portion 74 and a series of hollow portions 73. Support ribs 39 and hollow portions 73/74 may take on varying configurations, by way of example 6-9D. In one example, support ribs 39 may take on vertical, linear, and/or combinations of orientations to form segmented hollow portions 73/74 in configurations that assist in structure and the extruding process. Applicant realizes benefits in material minimization and cost efficiency, particularly in the top piece 30 and the trim profile 70. The material minimization is balanced against shape control and stability factors. The support ribs 39 may be minimized for material minimization and also intentionally configured and shaped to provide adequate or improved structure to the top piece 30 and trim profile 70.

In other embodiments, trim profile 70 may include an insert 81. Insert 81 may, by way of example, be wood or other suitable material to provide an anchor point for fasteners, for example storm door fasteners.

Figure 8:
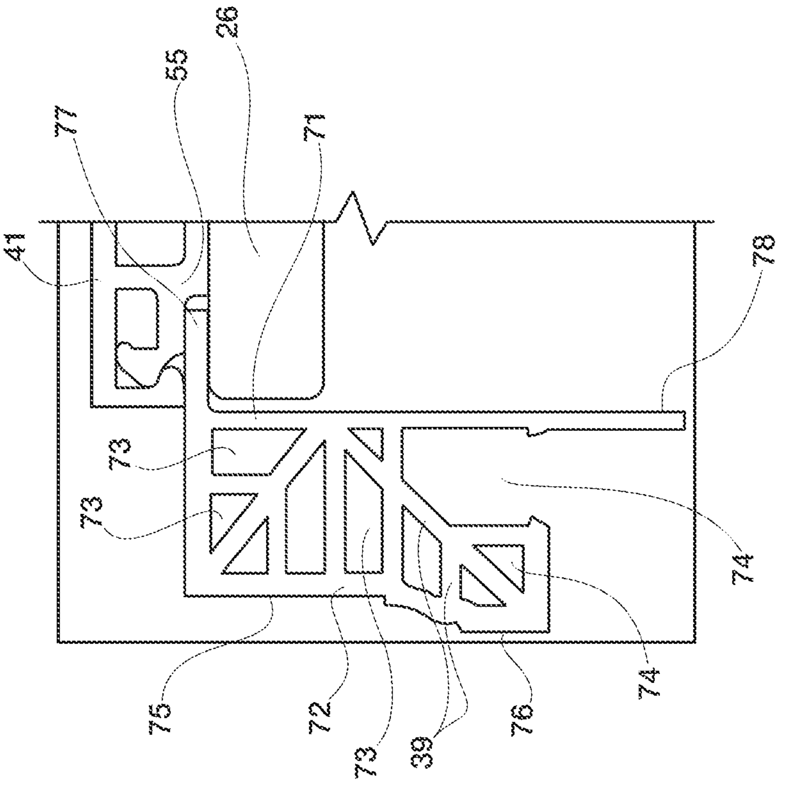
FIG. 8 is another example of a trim profile constructed according to the present disclosure.
Figure 8A:
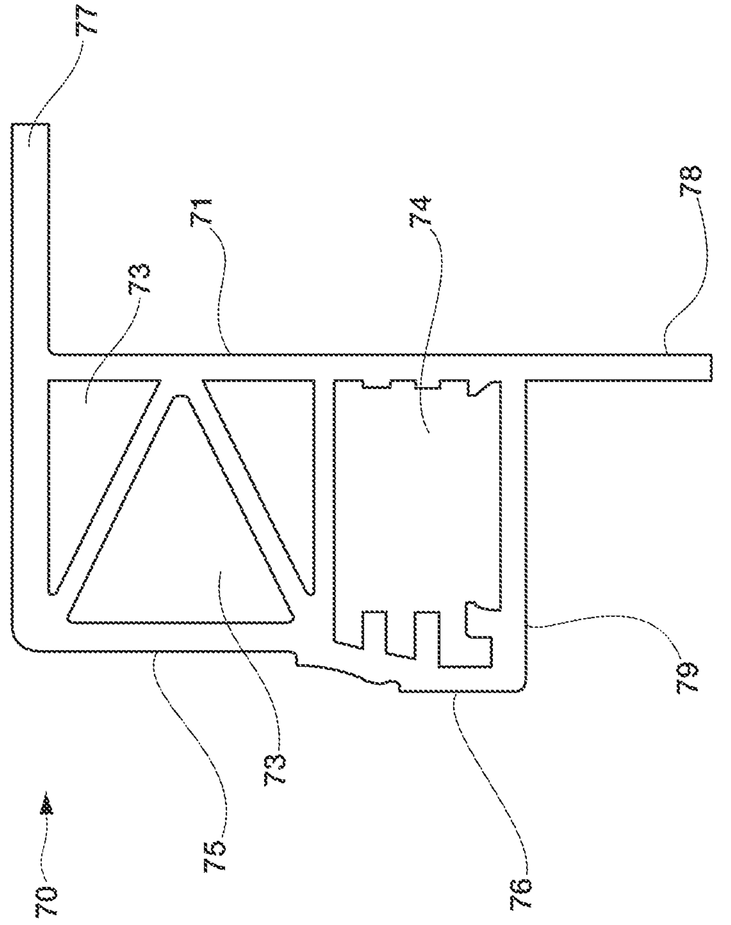
FIGS. 8A and 8B show alternate examples of the trim profile of FIG. 8.
Figure 8B:
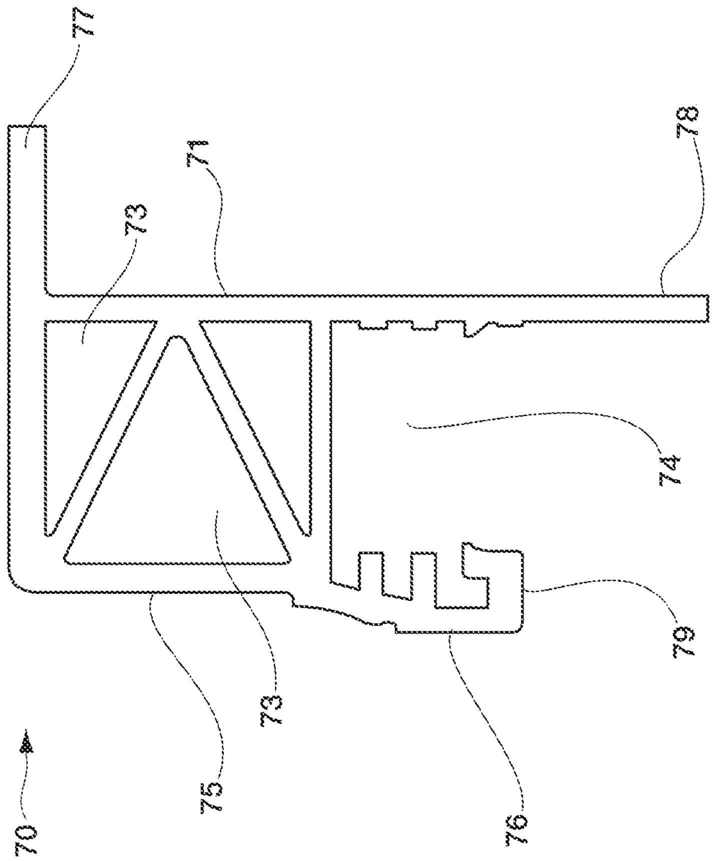
Figure 9:
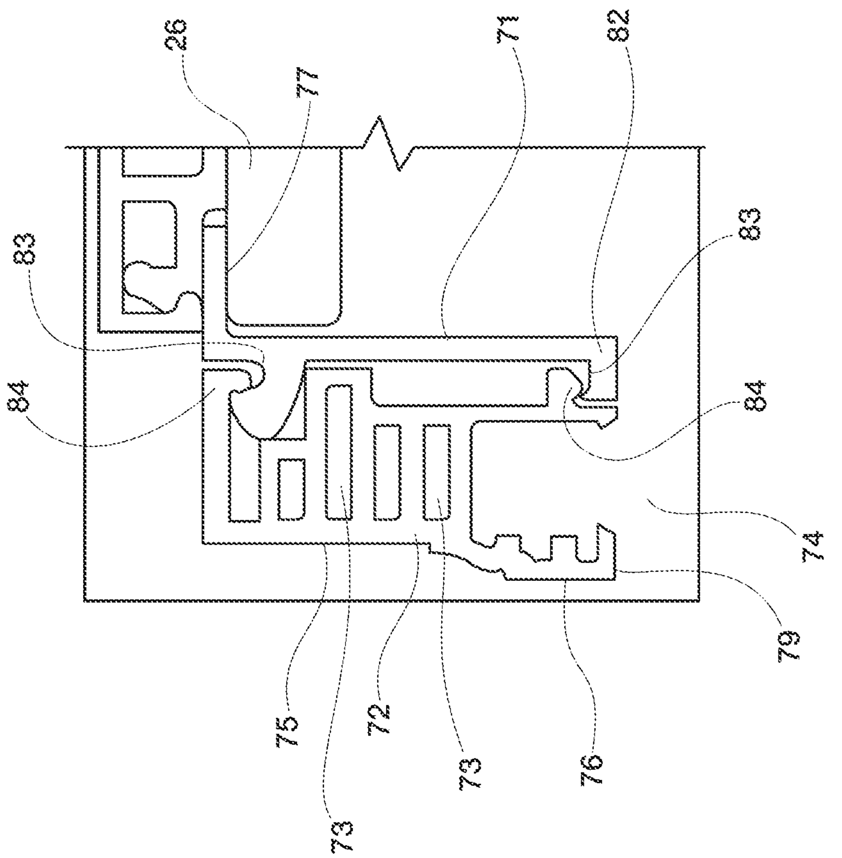
FIG. 9 is another example of a trim profile including a trim profile cover constructed according to the present disclosure.
Figure 9B:
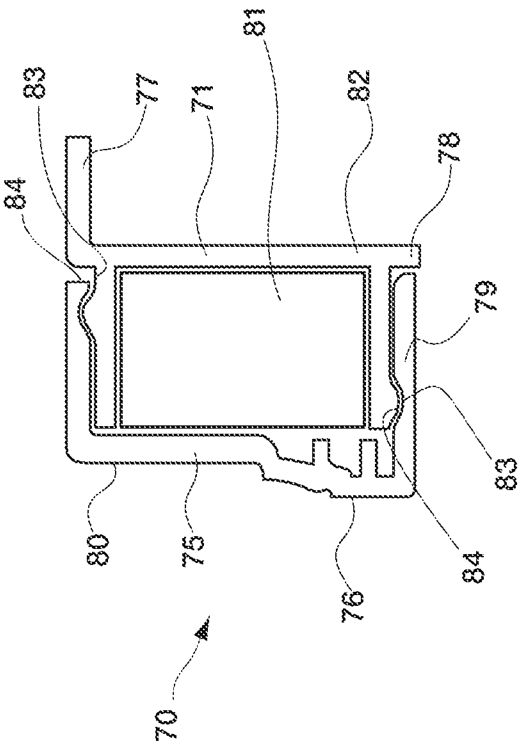
FIGS. 9A-D show alternate examples of the trim profile including a cover according to FIG. 9.
Figure 9A:
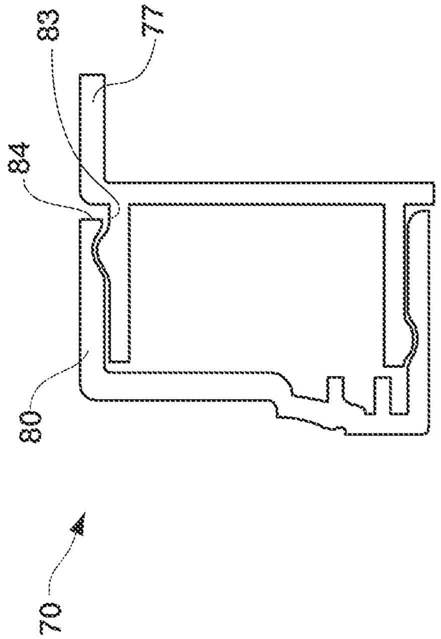
Figure 9C:
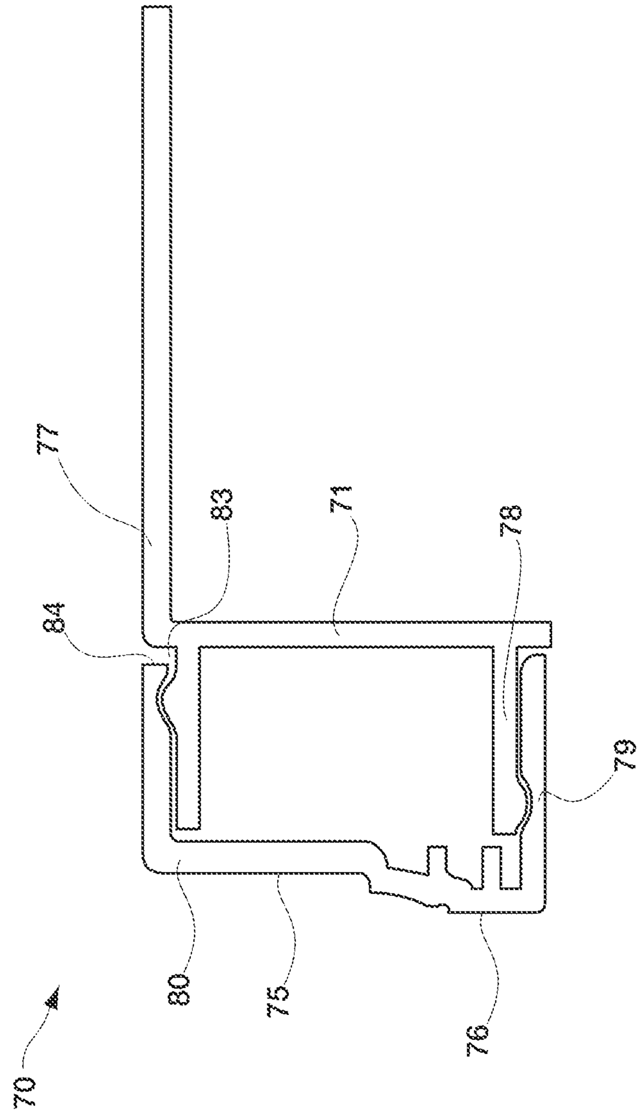
Figure 9D:
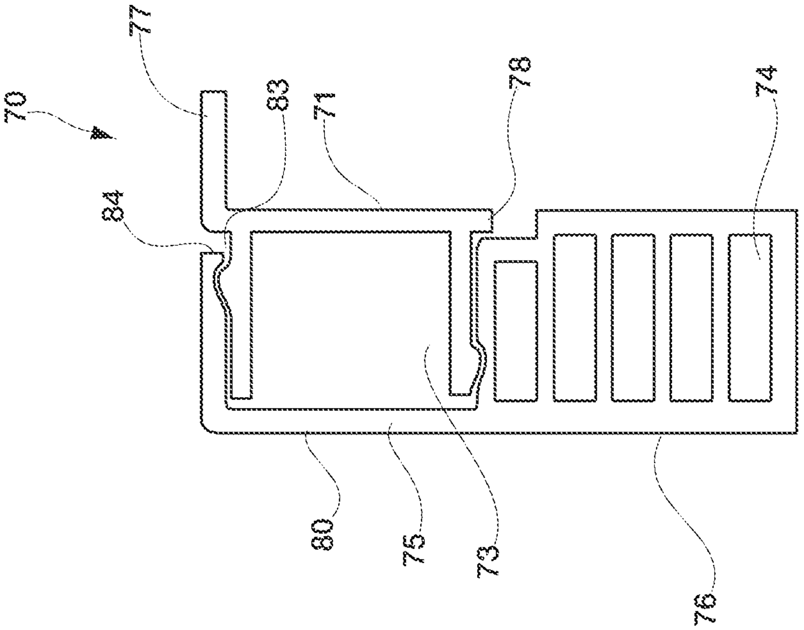

FIGS. 8A and 8B show that a portion of the trim profile between projecting segments 79 and 78, shown present in FIG. 8A and removed in FIG. 8B, may be cut away. The removable segment between projecting segments 78 and 79 may be cut away to allow, for example, vinyl siding J-Channel fitment.

Figure 13:
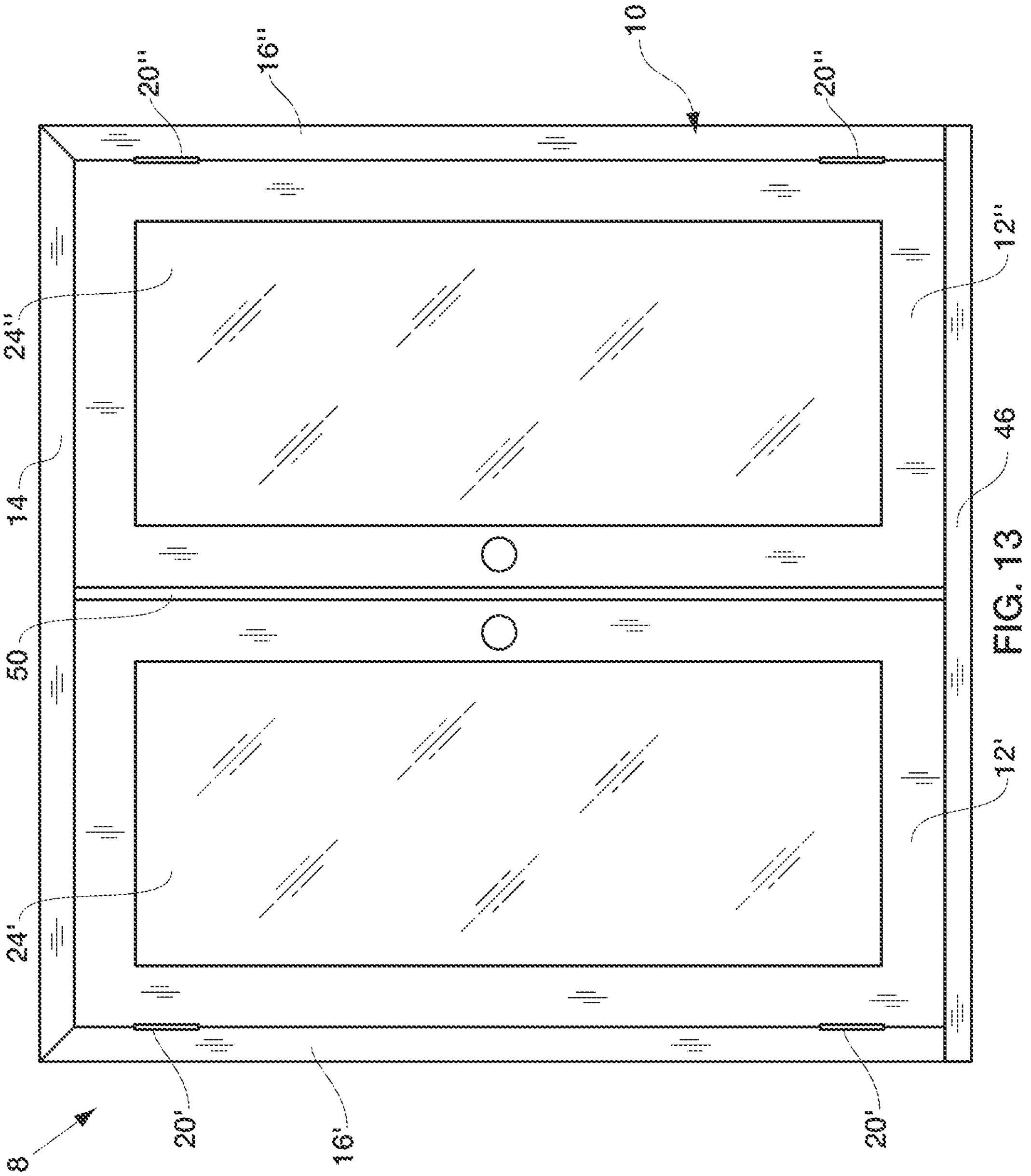
FIG. 13 is a front elevation view of another embodiment of a door assembly constructed according to the present disclosure.

Frame members 29 may be a part of any type of door assembly. For instance, the door assembly 8 may include at least one adjacent panel, designated as 42' and 42" in FIGS. 12 and 14, such as a side lite panel or a fixed panel. In certain embodiments, frame members may also include a mullion 44' and 44". Each adjacent panel may also adjoin a mullion 44' and 44" extending between the header and base of the door assembly 8. The door assembly 8 may further include a sill 46 located underneath the door panel. In other embodiments, as shown in FIG. 13, the door assembly includes two door panels 12' and 12" separated by way of example an astragal and/or a mullion 50. In yet other embodiments, the frame members described herein are not necessarily limited to door jambs and mullions and may alternatively be used for other assemblies such as windows.

Some examples include an adjustable frame member 29. An extended length core 26 and an extended length flange 77 may be included in an adjustable width frame system. The system may include the extended length core 26 and extended length flange 77 that are configured to be cut down or adjusted as needed to create a custom fit and narrower door jamb upon installation. Jambs are typically plumb and often fit against surfaces that may not be plumb. In one example, the adjustable width frame system may be a 2-piece system, including an extended length core 26 and/or an extended length flange 77, the system configured to also allow a give and positionablility within the adjustable frame member 29 to adjust to non-plumb surfaces at installation. Therefore, the adjustable width frame system is configured to accommodate variable door jamb sizing requirements and also non-plumb installation surfaces. The core 26 may extend beyond the top piece 30 in an adjustable width frame system. The system may include any of the jamb embodiments disclosed herein with an extended length core 26 and/or an extended length flange, by way of example, specifically the jamb frame member shown in FIG. 3, FIG. 3A and FIG. 3B.

Frame members may also include one or more cappings (not shown). One alternative embodiment includes wherein the rabbet portion 32 and stop portion 34 each further includes a capping. Capping may be co-extruded with the top piece 30, and is not necessarily limited to one layer. Alternatively, capping may be independently extruded to fit on top of a frame member and may cover at least a portion of a frame member. In one embodiment, the capping is a thermoplastic such as acrylic. In another embodiment, capping may be a composite of two or more materials. The composite of the capping may be comprised of a thermoplastic with a cellulosic filler such as wood. In other embodiments, the capping can be made of plastic without cellulosic filler, with another type of filler, or include a blowing agent. In other embodiments a capping may be placed onto core 26 without top piece 30. A capping may comprise two or more pieces, but in other embodiments, may comprise one piece covering at least a portion of core 26.

FIGS. 15 and 16A-C show embodiments where at least one frame member is a mullion having a core and a top piece. The top piece may be a 2-piece top piece. The mullion frame member may be structured similarly, as described herein throughout, as a jamb frame member, for example, of FIGS. 2-9.

Figure 15:
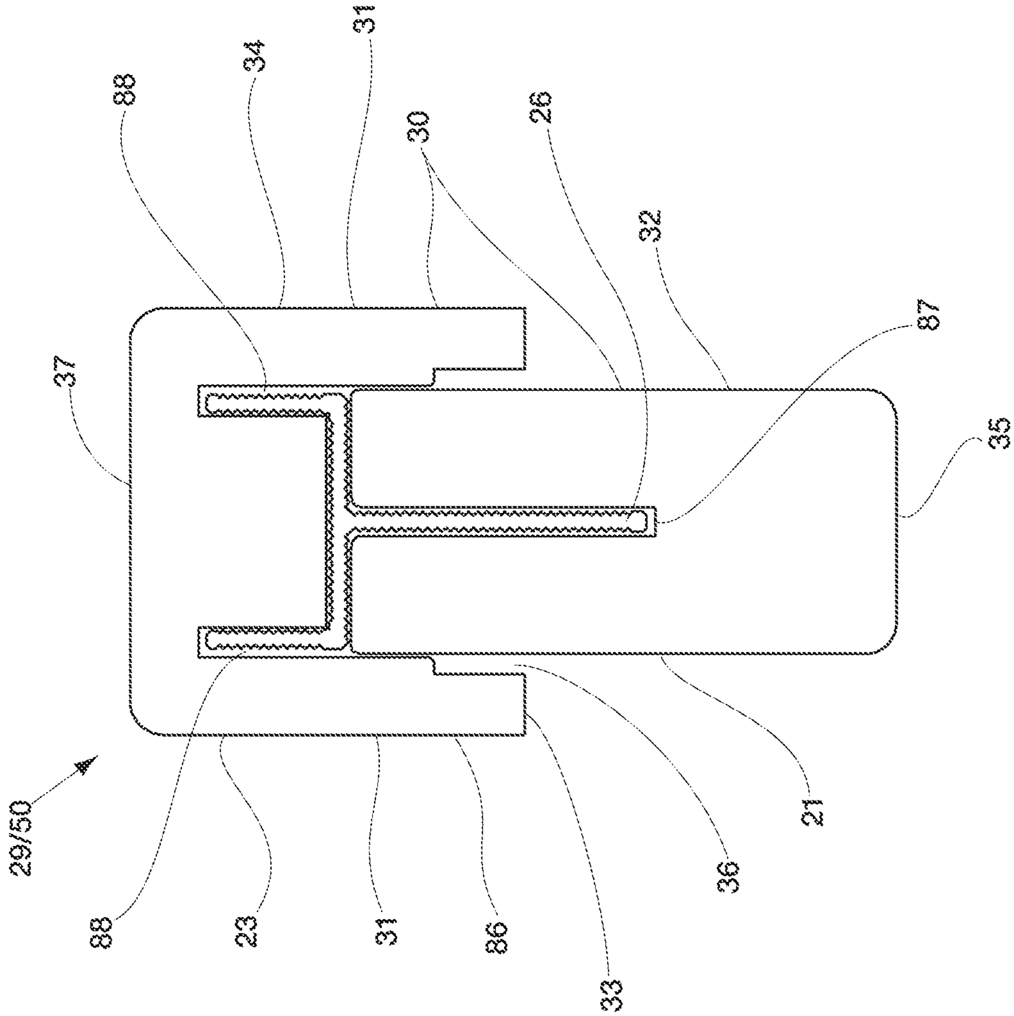
FIG. 15 is a cross-sectional view of one embodiment of a mullion frame member having a reinforced core and a top piece.
Figure 16:
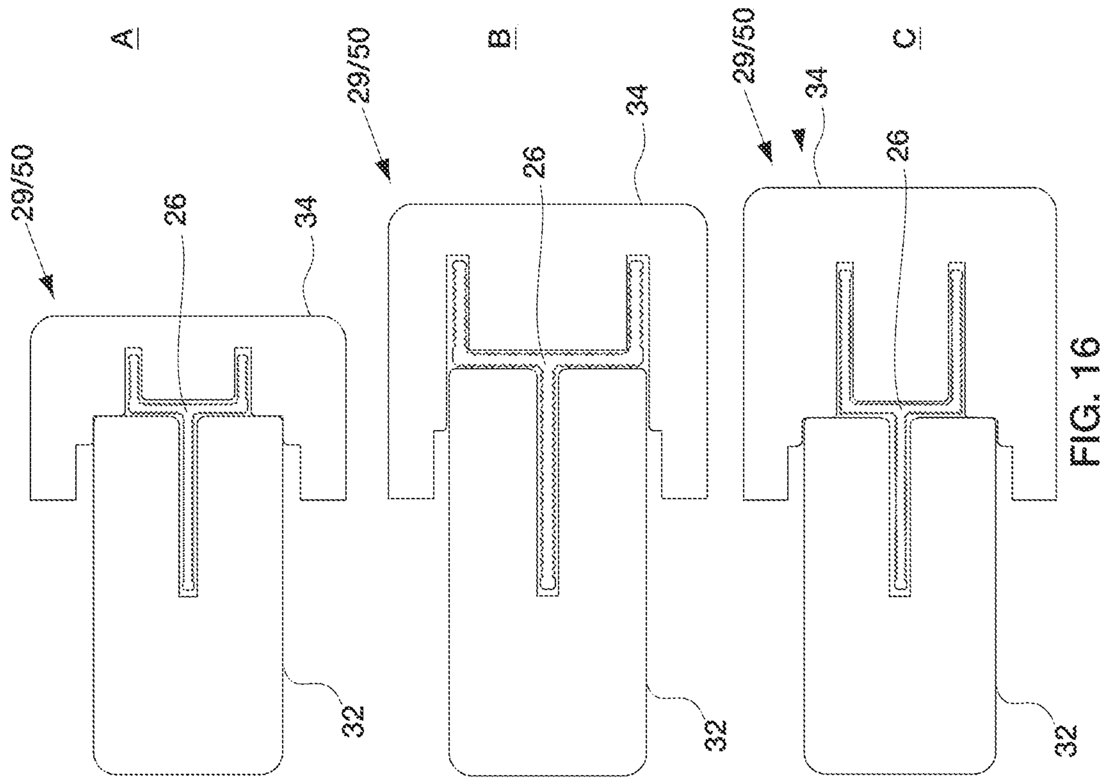
FIGS. 16A-16C are alternative examples of cross-sectional views of embodiments of a mullion frame member having a reinforced core and a top piece.

FIGS. 15 and 16 show another example of embodiments of a frame member 29 including a mullion component according to the present disclosure. The mullion component may be made of a durable material, resistant to degrading effects of moisture, heat and fungal attack. The mullion component may include an extruded aluminum reinforced core. In some examples, the mullion frame member 29 includes a stop component and a rabbet component, each formed by extruding a combination of PVC, wood fibers and a foaming agent. The components may be joined to an aluminum reinforced core by an adhesive. The aluminum extrusion is able to mate with slots integrally formed in the composite extrusions for proper positioning. The reinforced core and top piece are positioned to maximize contribution to structural and shaping integrity, to eliminate issues related to thermal transfer and interior moisture condensation, to accommodate placement of hardware fasteners without the need to pre-drill through the reinforced core, and to maximize hardware fastener holding strength.

In some examples, the invention of the disclosure may be considered an exterior door mullion including extrusions joined to a reinforced core member 26. In some examples, the extrusions may be a rabbet extrusion 32 and a stop extrusion 34 made of a moisture and decay resistant material, by way of example, all-plastic, a resin and plastic combination with wood or another suitable filler, and/or a blowing agent. The reinforced core member 26 may be a rigid member made of a rigid material, by way of example, aluminum. The reinforced core member 26 may be secured to the extrusions 32, 34, in one example, by way of adhesive. The reinforced core member and multiple extrusions may be configured to form a slot 36, the slot being configured to accept a weather stripping piece 40.

In other examples, the frame member 29 may be considered a mullion component including a one piece stop portion 34, a one piece rabbet portion 32 and a reinforced core 26. The stop portion may include a stop face 33, a recessed area 86 at the stop face, and a set of recessions 88. The rabbet portion 32 may include a recessed area 87. The reinforced core may take on the shape of at least a double-pronged fork and be sized and shaped to correspond to the recesses 88, 87 in the stop portion 34 and rabbet portion 32. The reinforced core may on the pronged side mate with the stop portion 34, with the prongs fitting into the recessions 88. The reinforced core on an opposite side, may mate with the rabbet portion 32 and extend into the recessed area 87. The reinforced core 26 may span the depth of the rabbet portion 32. The recessed area 86 may be configured to form a slot 36 when the rabbet portion and stop portions are joined. The stop portion and rabbet portion may be separated by the reinforced core except along an inner interface adjacent to the the slot 36. Shapes and sizes of the mullion components may vary as seen in the examples of FIG. 16A-C to accommodate various door assemblies, and are considered within the scope of this invention.

Certain modifications and improvements will occur to those skilled in the art upon a reading of the foregoing description. By way of example, the top piece can be of a unitary construction. The thickness of the top piece can be less than 10% of the total thickness in other embodiments. The plastic portion of the top piece may comprise all polyvinyl chloride. Moreover, the top piece can be made of plastic without cellulosic filler, with another type of filler, or include a blowing agent. Alternatively, the core's lower portion may be made from plastic without cellulosic filler, with another type of filler, or include a blowing agent. It should be understood that all such modifications and improvements have been deleted herein for the sake of conciseness and readability but are properly within the scope of the following claims.

We claim:

1. A door frame member comprising:

a core having an interior side and an exterior side, opposite the interior side, the core defining an opening extending between the interior side and the exterior side and a channel in one of the interior side or the exterior side;

a base defining an excerpt, the base attached to the core such that the excerpt aligns with the opening; and a removable cover removably attached to the base such that the base and the removable cover define one or more enclosed hollow cavities, the opening, the excerpt, the channel, and the one or more enclosed hollow cavities in communication with each other to define a storage compartment configured to house a door component, the storage compartment accessible by removing the removable cover from the base.

2. The door frame member according to claim 1, further comprising a trim profile attached to the door frame member.

3. The door frame member according to claim 1, wherein the core includes a lower portion formed of a decay resistant material.

4. The door frame member according to claim 1, wherein the base and the removable cover are made of a composite of cellulosic material and at least one other material.

5. The door frame member according to claim 1, wherein the base is attached to the exterior side, the core defining the channel in the interior side configured for the passage of component parts therethrough.

6. The door frame member according to claim 5, wherein the core defines another opening therethrough such that the channel is in communication with the exterior side of the of the core.

7. The door frame member according to claim 6, wherein the other opening is in communication with the one or more enclosed hollow cavities.

8. The door frame member according to claim 1, wherein the excerpt forms a break in the base such that the base is discontinuous along a length of the door frame member.

9. The door frame member according to claim 1, wherein the removable cover includes a stop portion and the base includes a rabbet portion, the rabbet portion is generally L-shaped and the stop portion is generally L-shaped, the stop portion overlapping the rabbet portion.

10. The door frame member according to claim 9, wherein the base attaches to the core such that the rabbet portion wraps about an end of the core.

11. The door frame member according to claim 1, wherein the base and the removable cover is made of a cellulosic-plastic composite.

12. The door frame member according to claim 11, wherein an amount of cellulosic material in the cellulosic-plastic composite is between about 20 weight percent and about 70 weight percent of the weight of the cellulosic-plastic composite.

13. The door frame member according to claim 1, wherein a thickness of the base and the removable cover attached to each other is between about 10% and about 50% of a total thickness of the door frame member.

14. The door frame member according to claim 1, wherein the door frame member is a doorjamb.

15. The door frame member according to claim 1, wherein the door frame member is a door mullion.

16. The door frame member according to claim 1, wherein the removable cover and the base each include an outer leg, a mid leg, and an inner leg projecting therefrom, the outer leg of the removable cover mating with the outer leg of the base, the inner leg of the removable cover mating with the inner leg of the base, and the mid leg of the removable cover engaged with the mid leg of the base such that the removable cover is biased laterally relative to the base to secure the removable cover thereto.

17. A method for including component parts in a door assembly, the method comprising:

securing a base to a core such that an excerpt defined by the base is aligned with an opening defined by the core;

mating a removable cover with the base such that the removable cover and the base define at least one hollow cavity therebetween in communication with the opening, the base, the removable cover, and the core defining a compartment configured to house the component parts therein;

forming a channel in the core; and forming at least one opening through the core in communication with the channel.

18. A door frame member comprising:

a core having a first side and a second side, opposite the first side, the core defining an opening extending between the first side and the second side and a channel in one of the first side or the second side; and a top piece attached to the core to form the door frame member, the top piece comprising:

a base defining an excerpt, the base attached to the core such that the opening, the channel, and the excerpt are in communication with one another; and a removable cover removably attached to the base, the top piece defining an enclosed hollow cavity between the base and the removable cover, the enclosed hollow cavity in communication with the excerpt, the channel, and the opening, the excerpt, the opening, the channel and the enclosed hollow cavity define a storage compartment configured to house a door component such that the door component is accessible by removal of the removable cover when the door frame member is installed in a door frame assembly.

19. A door frame assembly comprising:

a header;

a sill;

a first side jamb; and a second side jamb, at least one of the header, the first side jamb, or the second side jamb being a door frame member according to claim 18.

* * * * *